United States Patent
No et al.

(10) Patent No.: US 11,328,463 B2
(45) Date of Patent: May 10, 2022

(54) CROSS CULTURAL GREETING CARD SYSTEM

(71) Applicant: Kodak Alaris Inc., Rochester, NY (US)

(72) Inventors: Young No, Rochester, NY (US); Joseph A. Manico, Rochester, NY (US)

(73) Assignee: KODAK ALARIS, INC., Rochester, NY (US)

( * ) Notice: Subject to any disclaimer, the term of this patent is extended or adjusted under 35 U.S.C. 154(b) by 79 days.

(21) Appl. No.: 15/299,944

(22) Filed: Oct. 21, 2016

(65) Prior Publication Data

US 2017/0140563 A1    May 18, 2017

Related U.S. Application Data

(60) Provisional application No. 62/255,239, filed on Nov. 13, 2015.

(51) Int. Cl.
| | |
|---|---|
| G06T 11/60 | (2006.01) |
| G06Q 30/02 | (2012.01) |
| G06F 40/58 | (2020.01) |
| G06F 3/0482 | (2013.01) |
| H04N 1/00 | (2006.01) |

(52) U.S. Cl.
CPC ............ *G06T 11/60* (2013.01); *G06F 3/0482* (2013.01); *G06F 40/58* (2020.01); *G06Q 30/0255* (2013.01); *G06Q 30/0271* (2013.01); *G06Q 30/0281* (2013.01); *H04N 1/00167* (2013.01); *H04N 1/00188* (2013.01); *H04N 1/00198* (2013.01); *G06T 2200/24* (2013.01)

(58) Field of Classification Search
CPC ...... G06F 3/0482; G06F 17/289; G06T 11/60; G06T 2200/24; H04N 1/00167; H04N 1/00188
See application file for complete search history.

(56) References Cited

U.S. PATENT DOCUMENTS

| | | | |
|---|---|---|---|
| 5,426,583 A * | 6/1995 | Uribe-Echebarria Diaz De Mendibil | G06F 17/271 704/2 |
| H1708 H * | 2/1998 | Davidson | H03G 7/06 364/479.01 |
| 7,216,092 B1 * | 5/2007 | Weber | G06Q 10/087 358/1.13 |
| 9,405,741 B1 * | 8/2016 | Schaaf | G10L 15/08 |
| 9,686,217 B2 * | 6/2017 | Prabhu | G06F 3/04842 |
| 2001/0021914 A1 * | 9/2001 | Jacobi | G06Q 30/02 705/14.53 |

(Continued)

OTHER PUBLICATIONS

International search Report dated Jan. 19, 2017 in International Application No. PCT/US2016/058115.

(Continued)

*Primary Examiner* — Eric J. Bycer
(74) *Attorney, Agent, or Firm* — Hogan Lovells US LLP

(57) ABSTRACT

A system and method for creating customized, personally relevant greeting cards, e-cards, mementos, invitations, decorations, and other types of printed and virtual media to convey affection, friendship, emotional connections, celebration, gratitude, condolence and other types of sentiments to relatives, friends, coworkers, business associates, and acquaintances regardless of the cultural backgrounds of the giver and the recipient.

22 Claims, 7 Drawing Sheets

(56) References Cited

U.S. PATENT DOCUMENTS

| | | | |
|---|---|---|---|
| 2002/0072952 A1* | 6/2002 | Hamzy | G06Q 30/0277 705/7.29 |
| 2002/0116629 A1* | 8/2002 | Bantz | G06Q 30/02 726/26 |
| 2003/0004997 A1 | 1/2003 | Parker et al. | |
| 2007/0033048 A1* | 2/2007 | Pollard | G06F 40/174 704/260 |
| 2007/0067398 A1* | 3/2007 | Karmarkar | H04L 51/38 709/206 |
| 2008/0082381 A1* | 4/2008 | Muller | G06Q 10/10 705/344 |
| 2008/0235095 A1* | 9/2008 | Oles | G06Q 30/0225 705/14.26 |
| 2009/0199230 A1* | 8/2009 | Kumar | G06Q 30/0268 725/32 |
| 2010/0017278 A1* | 1/2010 | Wilen | B42D 15/045 705/14.2 |
| 2010/0268682 A1* | 10/2010 | Lewis | G06Q 10/107 706/54 |
| 2012/0054284 A1* | 3/2012 | Rakshit | G06F 40/274 709/206 |
| 2013/0204739 A1* | 8/2013 | Friedman | G06Q 30/0631 705/26.7 |
| 2013/0283388 A1* | 10/2013 | Ashok | G06F 21/554 726/26 |
| 2013/0283401 A1* | 10/2013 | Pabla | G06F 21/60 726/30 |
| 2013/0325671 A1 | 12/2013 | Glass et al. | |
| 2013/0344942 A1* | 12/2013 | Price | G07F 17/3237 463/25 |
| 2014/0181221 A1* | 6/2014 | Kushtagi | G06Q 10/107 709/206 |
| 2015/0070516 A1* | 3/2015 | Shoemake | H04N 21/42203 348/207.11 |
| 2015/0278196 A1* | 10/2015 | Dua | G06F 40/30 704/9 |
| 2016/0162576 A1* | 6/2016 | Arino de la Rubia | G06F 40/279 707/739 |
| 2016/0291855 A1* | 10/2016 | Chang | G06F 16/5866 |
| 2016/0294755 A1* | 10/2016 | Prabhu | H04L 51/046 |
| 2017/0046334 A1* | 2/2017 | Connor | G06F 40/56 |

OTHER PUBLICATIONS

Written Opinion dated Jan. 19, 2017 in International Application No. PCT/US2016/058115.

* cited by examiner

Fig. 4a

Please describe the person you are creating this card for...

- Gender: Male | Male | Female | More Choices
- Age: 70 | ↑ ↓ | Select
- Cultural Background: Korean | ↑ ↓ | Select
- Religious Affiliation: Buddhist | ↑ ↓ | Select
- Relationship to you: Business | ↑ ↓ | Select
- Emotional Intent: Friendship | ↑ ↓ | Select
- Occasion/Event: Birthday | ↑ ↓ | Select
- Language: Korean | ↑ ↓ | Select

NEXT  BACK  START OVER

Fig. 4b

Please describe yourself as the creator of this card...

- Gender: Female | Male | Female | More Choices
- Age: 29 | ↑ ↓ | Select
- Cultural Background: American | ↑ ↓ | Select
- Religious Affiliation: Agnostic | ↑ ↓ | Select
- Language: US English | ↑ ↓ | Select

NEXT  BACK  START OVER

Fig. 5a

Profile Details LUT (1220)

| Relationship | Emotional Intent | Occasion | Cultural Profile | Religious Affiliation |
|---|---|---|---|---|
| Acquaintance | Fun | Birthday | US Central | Christian |
| Neighbor | Humor | Wedding | US East | Evangelical |
| Coworker | Friendship | Holiday | US West | Catholic |
| Client | Romance | Personal | Japan | Jewish |
| Employee | Good will | Illness | China | Islam |
| Supervisor | Respect | New Job | Korea | Hindu |
| Friend | Condolence | New Baby | France | Buddhist |
| Close Friend | Affection | Funeral | UK | Baha'i |
| Romantic | Love | Bon Voyage | Middle-East | Shintoism |
| Relative | Congratulations | Christmas | Africa | Taoist |
| Child | Thinking of you | Hanukah | Turkey | Agnostic |
| Parent | Forgiveness | Ramadan | Mexico | Atheist |
| Sibling | Sympathy | Anniversary | Argentina | Humanist |
| In-Law | Appreciation | Engagement | Brazil | Santeria |

Columns: 1230, 1240, 1250, 1260, 1270

Fig. 5b

Card Components LUT (1280)

| Font Colors | Graphics | Flowers | Symbols | Language |
|---|---|---|---|---|
| Red | Watercolor | White-Roses | Cat | US English |
| Light-Red | Oil Painting | Red-Roses | Butterfly | UK English |
| Dark-Red | Photo | Pink-Roses | Mouse | Spanish |
| Pink | Solemn | Poppy | Badger | Portuguese |
| Orange | Classical | Carnation | Snake | French |
| Green | Trendy | Violets | Turtle | Dutch |
| Light-Green | Traditional | Pansies | Dog | Japanese |
| Dark-Green | Humorous | Cherry | W Astrology | Cantonese |
| Turquoise | Sweet | Orange | E Astrology | Mandarin |
| Blue | Casual | Apple | Cross | Korean |
| Light-Blue | Formal | Zinnia | Star of David | Afrikaans |
| Dark-Blue | Inspirational | Daisy | Moon & Star | Somali |
| Cobalt | Friendly | Snap Dragon | Namaste | Arabic |
| White | Respectful | Tiger Lily | Ying Yang | Farcie |

Columns: 1290, 1300, 1310, 1320, 1330

CROSS CULTURAL GREETING CARD SYSTEM

CROSS REFERENCE OF RELATED APPLICATIONS

This application claims the benefit of U.S. Provisional Application No. 62/255,239 filed on Nov. 13, 2015 and hereby incorporates by disclosure thereof in its entirety.

BACKGROUND OF THE INVENTION

Today, cultural and geographic boundaries are eroding, and people with very diverse cultural backgrounds are now colleagues, coworker, friends and families. However, it is a cross-cultural norm to commemorate or recognize significant personal, life, and cultural events such as births, deaths, weddings, funerals, graduations, holidays, religious observances, national holidays, celebrations, and the like. Problems arise when individuals from very different cultural backgrounds wish to exchange a "commemorative token" of an important event or to express a personal feeling without having specific knowledge of the culturally acceptable style, content, format, or details.

It is well known to use computer based language translation, but much more is required to convey a sentiment with culturally appropriate symbols, images, colors, graphics, and appropriate contextually accurate idiomatic phrases. There are many cross-cultural books and guides for use when visiting a foreign country or interacting with a person from a different culture but these require study and would need to be interpreted by the user for the information to be useful in selecting or creating a greeting card, or the like that would be culturally appropriate. An innocuous choice, such as selecting a birthday card for an English speaking South Korean colleague that includes red colored text would be insulting since in the Korean culture red ink is reserved for the deceased. Cultural preferences and taboos vary greatly from culture to culture. Images of animals, for instance, have great significance in most cultures but the symbolic implications of an individual type of animal vary greatly between cultures. For instance, in China the badger is a symbol great happiness, however in the West the badger is seen as an annoying pest and the source of the expression "to badger someone." So a depiction of this animal would be appropriate for a birthday card for a Chinese adult but not for an American adult, who could very well see the image as a personal, less than subtle insult.

In addition, poorly chosen colors and graphics may convey an inappropriate sentiment. If a US female salesperson received a card from an Asian client that had an image of a large arrangement red roses and used a highly stylized red colored font and pink graphics, regardless of the personal message the card would be perceived as romantic even if the intention was friendship or gratitude.

Prior art approaches for providing socially appropriate customized greeting cards have included U.S. Pat. No. 5,600,563, titled; "System for printing social expression cards." This approach provides users with a means to produce greeting cards by selection from a database and allows for a degree of user customization. The various surfaces of the virtual card are individually viewed on the monitor to assure that images and text are properly positioned. If modifications are required, the appropriate steps are repeated. Upon selection of a category, one or more card images linked to the category are retrieved and displayed on the color monitor. The system does provide a general class of card category selection for the type of social expression card desired such as "Birthday" "Anniversary" "Get Well" and sub-classification such as "Relative," "Children" or "Humorous."

US Patent Application US2003/0004997A, titled; "Method for online personalization of greeting cards" provides a system and method for providing convenient manufacture and delivery of customized greeting cards via a website that allows a user to enter information used to assist in the selection of an appropriate expression and image. In addition, an advertisement, sales promotion or product sale can be associated with the greeting card and used to subsidize the cost of the greeting card. The website also allows users to seek assistance from others with respect to expressions and images and are categorized by occasion.

US Patent Application US2009/0276207A1 titled; "Host Greeting Card" is a bilingual greeting card that celebrates immigrant's holidays in a host country. The bilingual greeting card has text in the language of the host country and in the immigrant's language of their foreign country and may celebrate the immigrant's Holiday. For example, a Chinese New Year card in English and Chinese that is sold in the United States. The Chinese New Year card is bilingual and uses greetings from the immigrant's country or some verse related to his or her country, and also has pictures or images relating to the immigrant's celebration or holiday.

U.S. Pat. No. 8,751,474B2, titled, "Card Customization by Tailored Intergenerational Historic Snapshots" is a user-customized card that includes a tailored intergenerational historic snapshot message that informs a younger person about the world an older person lived in when they were young. The older person's age and the younger person's age may be used to identify a historic time period in which the older person was the same age as the younger person. A circumstance that occurred in the historic time period may be selected from a database or web search result. The message may be tailored to the ages of the people involved. The message may also be tailored to recite circumstances specific to a topic area or a geographic location. The message may be used in the text generally, and in photo captions specifically. The card may be a greeting card, birthday card, gift card, or other card. Items other than cards may also be customized with such a message. This system is intended to assist users to easily create personalized notes to your loved ones for birthdays, anniversaries, graduations, holidays, and other special events. These notes are automatically filled by the system with historic facts that are chosen based on each individual's interests and are intended to help remind loved ones that even though the world has changed, their family relationships are stronger than ever.

None of the afore mentioned systems or methods take into account the potential cultural and social distinctions between the giver and the recipient and provide any means to recognize and mitigate any resulting inadvertent inappropriate or offensive sentiments, text, graphics, photos, colors, photos, or gestures that could be included in a cross-cultural greeting card. In addition, none of the systems or methods provides detailed interactive explanations of the positive and negative significance and implications of the greeting card and greeting card elements so that the giver can fully appreciate the intended sentiment to convey to the recipient and to ensure that the appropriate sentiment was selected. The prior art does not require cultural profiles of the giver or the recipient, or modify the presentation sequence of card elements and options or profile questions based on previously provided profile information. In addition, the prior art does not take into account the national, local, and regional laws, rules, or social mores of where the invention is practiced and provide means to modify the user experience and product options in accordance with these geographic and demographic social norms and orientations.

SUMMARY OF THE INVENTION

What is required is a system and method for a user to designate a type of event and emotion she wishes to convey, her own cultural background, and the cultural background of the recipient via dynamically modified sequence of multiple choice questions. In addition to cultural background of the recipient, basic information is required to further enhance the appropriateness of the expression. With access to information on age, gender, social status, relevant geographic locations, relationship to the presenter and cultural background information an appropriate a series relevant greeting card styles, components, or the like can be automatically selected from a database for review and approval. Also with access to cultural profile information, greeting cards to celebrate culturally specific holidays and events can be provided based on the probable or potential interest to the user or the recipient. The greeting cards can be digitally stored as templates with interchangeable text, colors, and fonts, characters from various languages, translations, culture specific idiomatic phases, graphics, and images. Once created, the selection of appropriate greeting products are shown to a potential giver on a touch screen of a mobile phone, tablet, personal computer, or kiosk for final selection by the giver and customizations such as including a personal image, the name of the recipient, and/or a personal message. With each potential selection, an explanation and translation of the cultural significance, history, traditions, taboos, and implications of the text and graphics is provided to aid the user in making an appropriate selection and presentation of the greeting card and a better appreciation of the of the recipient's cultural perspective. In addition, the national, local, and regional laws, rules, or social mores of where the invention is practiced are taken into account and means are provided to modify the user experience and product options in accordance with these geographic and demographic social norms and orientations. The system and method of the present invention is directed at creating and producing a physical or virtual greeting card product to convey an intended emotion or to recognize or celebrate an important life event or occasion and to avoid inappropriate or unintended sentiments.

BRIEF DESCRIPTION OF THE DRAWINGS

FIG. 4a is a representation of a GUI screen for providing a recipient profile for creating a cross-cultural greeting card.

FIG. 4b is a representation of a GUI screen for providing a creator profile for creating a cross-cultural greeting card.

FIG. 5a is an example of a Look Up Table of potential multiple choice responses to profile questions.

FIG. 5b is an example of a Look Up Table of potential greeting card graphical components and templates that are prioritized in response to profile questions.

DETAILED DESCRIPTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase "digital image," as used herein, refers to any digital image, such as a digital still image or a digital video. Digital videos are generally composed of a plurality of video frames, each of which can also be treated as an individual digital image.

Figure 1:
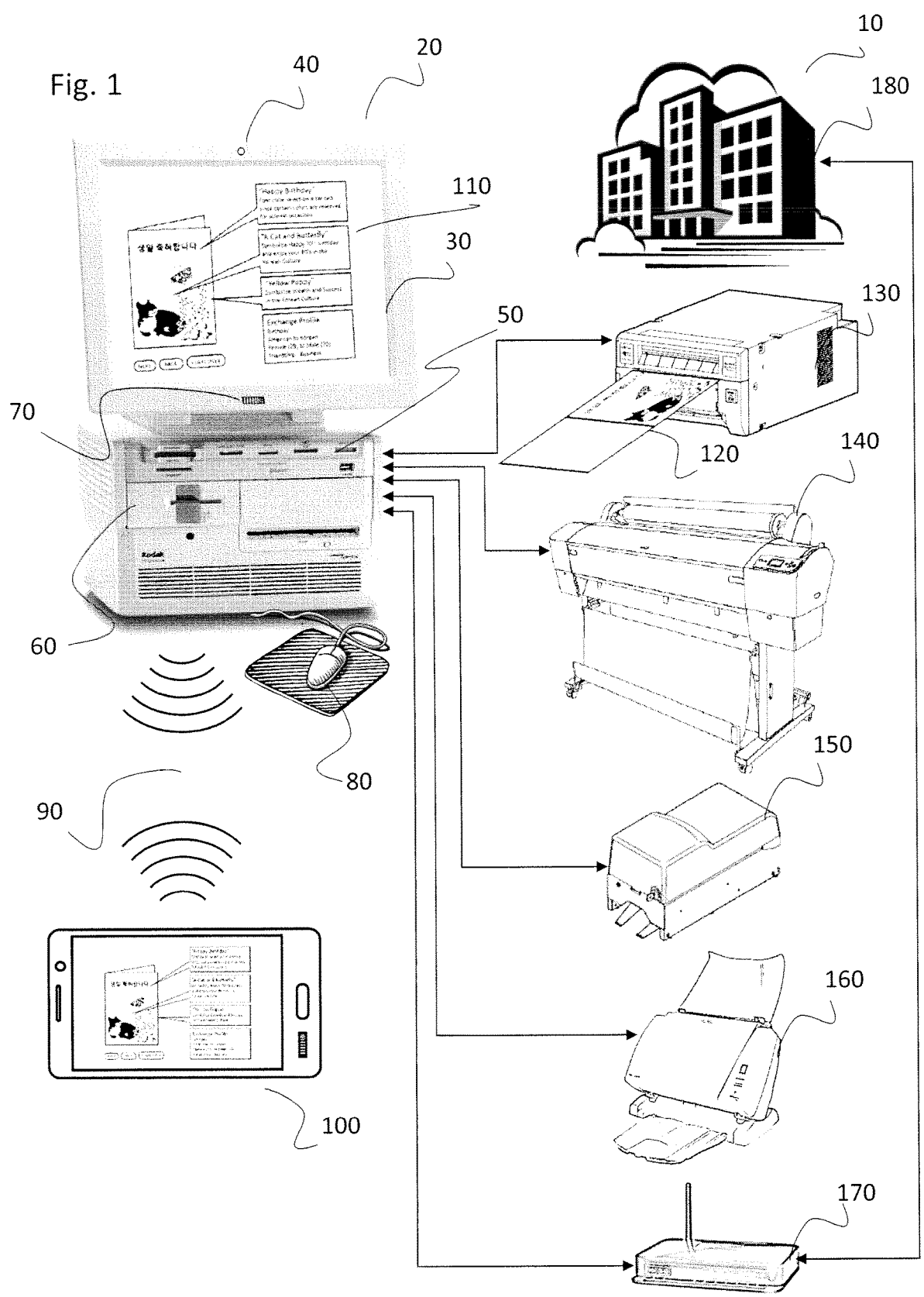
FIG. 1 is a graphical representation of a system for creating and fulfilling a cross-cultural greeting card.

FIG. 1 depicts a graphical representation Cross-Cultural Greeting Card System 10, which is a system for creating and fulfilling cross-cultural greeting cards. Cross-Cultural Greeting Card System 10 includes Photo Kiosk 20 as a device to enable user interaction and provide instructions on product creation and ordering. As used in the context of the present invention, the terms "user," "giver," "creator," "customer" and "presenter" are used interchangeably and represent the individual that is responsible for providing the greeting product to the recipient. Also included are Touch Screen Display 30, to enable the system's Graphic User Interface (GUI) and Camera 40 to capture images of the user and to monitor the user's expressions and gestures during operation of Photo Kiosk 20, or to be used to determine if a potential customer is present and may require service. Physical Media Connectors 50 are provided to interface with memory and recording devices such as USB enabled cameras and music players, video cameras, sound recorders, portable hard drives, SD cards, USB and other formats of solid state memory. These are provided to the user to enable the use of personally recorded or owned audio visual content such as video, still photographs, text, and recorded audio for use in creating a cross-cultural greeting card product. Card Reader 60 is provided for the use of credit, debit, and/or Identification Cards to pay for service and/or to collect identification information. Additionally or alternatively a well-known in the art currency acceptor, not shown, is used to accept paper currency and/or coins to pay for service.

Microphone 70 is provided for voice annotation for a virtual cross-cultural greeting card product or physical sound or video module augmented "talking greeting cards" or "video greeting cards," voice-to-text annotation input, or for voice commands to control the operation and usage of Photo Kiosk 20. Talking Greeting cards and or Video Greeting cards can be used to present custom printed text, graphics, photos and the like in addition to a personally recorded audio message, a video clip, or a digital slide show with voice or music annotation. Audio and or video content can be recorded at Photo Kiosk 20 using Microphone 70 and Camera 40, or audio and video content can be provided by the user to Kiosk 20 via Physical Media Connectors 50 or via Two-way Wireless Connection 90. Pointing Device 80 is an alternative user interface modality to be used to augment the Touch Screen Display 30. Pointing Device 80 can be a conventional wired or wireless mouse, track pad, joystick, electronic stylus and tablet, or the like devices with or without haptic feedback. Two-way Wireless Connection 90 is provided to enable Bluetooth® and/or Wi-Fi™ or similar means for digital wireless transmission and reception for communication with user devices such as Mobile Phone 100, or any suitable wireless digital recording or storage device, not shown. With Mobile Phone 100, wireless communication with Photo Kiosk 20 via Two-way Wireless Connection 90 can be established by any known method including using printed and displayed codes such as bar codes or QR codes, not shown, or alternatively through any conventional means to establish a wireless connection between devices. The Mobile Phone 100, includes a camera that can be used to record printed or displayed codes, which are used to establish a secure wireless link with Photo Kiosk 20, which provide links to additional software, applications, and/or promotions as described in U.S. Pat. No. 7,912,426 entitled, "Production of visual codes for pairing electronic equipment."

Greeting Card Graphic 110 is shown on Touch Screen Display 30 on Photo Kiosk 20, which provides the user with a Graphics User Interface, instructions on producing the card, information explaining the significance of the card, and virtual representations of potential cards offered for purchase. It should be noted that the user can purchase physical greeting cards and other printed media products as well as virtual media for electronic distribution. The term "greeting card," as used to in context of the present invention, refers to any custom produced printed or electronic media that includes text, graphics, and or photos designed to be given or presented as a token to convey an intended emotion or to recognize or celebrate an important or meaningful life event or occasion. Graphics User Interface on Photo Kiosk 20 allows the user to select the format of the card, such as a greeting card, photo greeting card, e-card, post card, large card, greeting card with an audio module, greeting card with a video module, memory book, poster, etc. Also provided are various multimedia color hardcopy and virtual input and output peripheral devices including Digital Printer 130 such as a single sided or duplex color dye sublimation shown producing Printed Greeting Card 120 and Large Format Digital Printer 140 for producing large sized hardcopy products such as posters, yard signs, banners, party decor, and the like. CD/DVD Reader/Writer 150 is provided for virtual and multimedia input content such as professionally produced graphics templates, user provided digital images, and electronic output products on physical media such as a multimedia DVD greeting product. In addition, Hardcopy Scanner 160 is provided to digitize user provided hardcopy prints, negatives, and transparencies for use in greeting card products.

Wireless Router 170 is used to provide a wireless access point to access the Internet or a private computer network. It can be used in a wired LAN (local area network), in a wireless-only LAN (WLAN), or in a mixed wired/wireless network and can be used to provide users with access to the Photo Kiosk 20 via their personal wireless devices such as Mobile Phone 100. Greeting products that are not suitable for retail production due to the capital investment relative to potential sales at a single retail outlet and the skill requirements to produce more complex greeting products are produced at Remote Production Facility 180. For remotely produced Greeting Products, Photo Kiosk 20 is used to accept instructions, input, selections, order information, and or content provided by the user for use in producing the greeting product. However, this information will be forwarded from Photo Kiosk 20 to Remote Production Facility 180. Greeting products produced at Remote Production Facility 180 can be shipped back to the originating retail outlet, directly to the user, or to the user's intended recipient. Remotely produced greeting products, not shown, include: custom printed and cut yard signs; large posters; multi-page cards; books; and the like.

Figure 2:
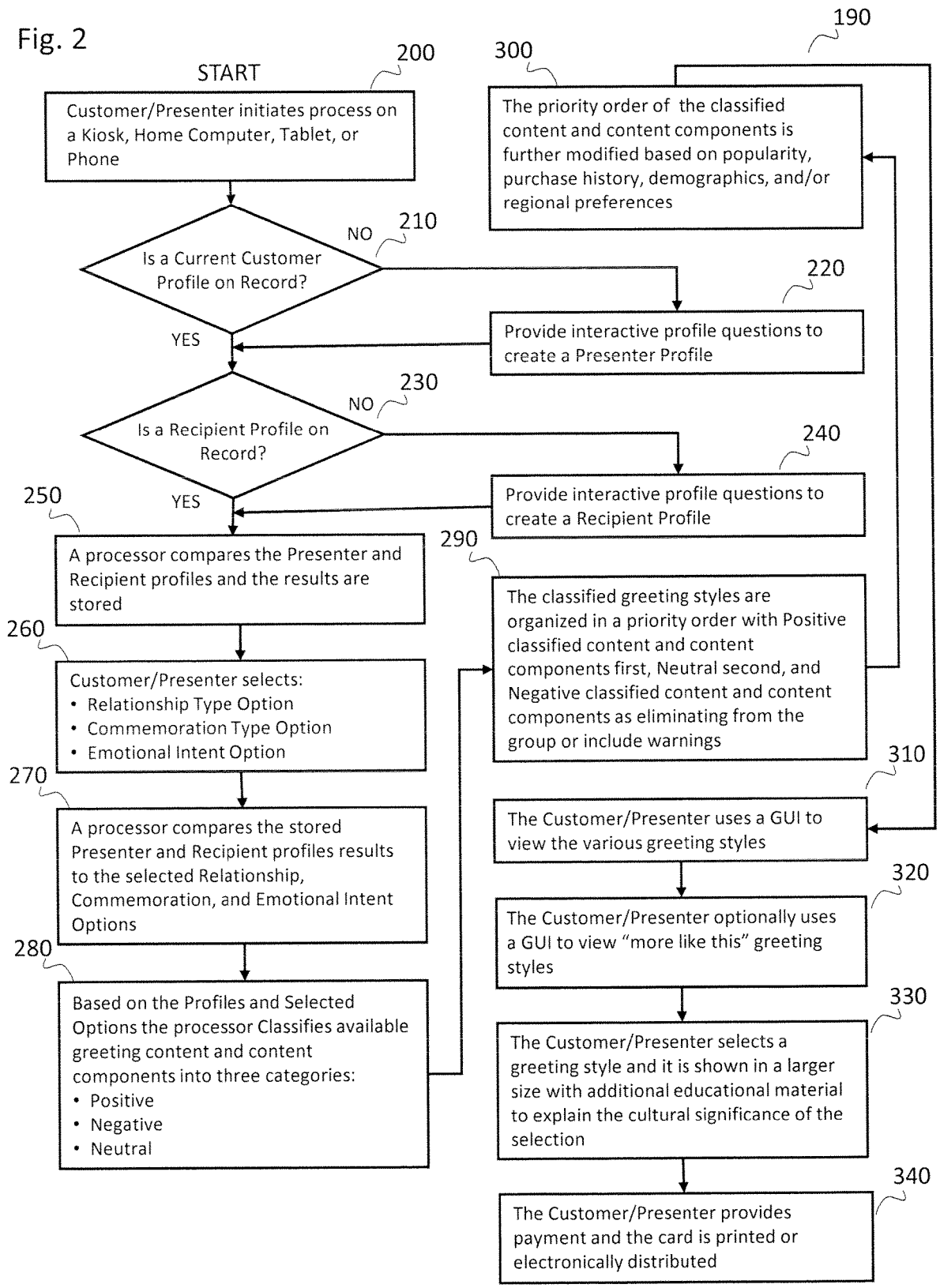
FIG. 2 is a flowchart of the process for creating a cross-cultural greeting card.

FIG. 2 is a flowchart of the process for creating a cross-cultural greeting card. The process illustrated by System Flowchart 190 includes Initialization Step 200, which includes selecting an application on a smart phone or tablet, accessing a dedicated website with a personal computer, or using a Photo Kiosk at a retail venue. If the Photo Kiosk 20 is used, it can include Camera 40 which can be used to determine if a potential customer is present and may require service. This can take the form of the program initiating when a customer is standing directly in front of the kiosk and alerting a potential customer with a promotional audiovisual message, such as "Try our new Greeting Card System." In an alternative embodiment, Photo Kiosk 20 can contact potential customers via their smart phones when they are within range of the wireless network associated with Photo Kiosk 20. This process would recognize a user who has previously used the system via their phone, had previously installed the application version of the Cross-cultural greeting card software on their phone, or the system could send out a wireless promotional message that the customer can accept or reject.

With any of the afore mentioned computational platforms, once the customer is engaged in the process with the system, via the Graphic User Interface (GUI), the GUI inquires whether the customer has a profile on record at Customer Profile Decision Step 210. Alternatively, if the user accesses the system via a personal computational device, their identity is provided by the device and can be used to verify whether a presenter profile is available, or if Photo Kiosk 20 is accessed, Camera 40 can be used in conjunction with a processor enabled face recognition algorithm to recognize the identity of the customer. If there is no Presenter profile on record, the process proceeds to the Interactive Presenter Profile Step 220. At this step the Presenter interacts with the system GUI and provides profile information to the system via a dynamically modified sequence of multiple choice questions to efficiently collect demographic information including gender, age, cultural background, religious affiliation, and language and the like. Additional details of this process step required to perform such other interactions with Cross-Cultural Greeting Card System 10 will be described later.

Turning now to Recipient Profile Decision Step 230, if user indicates through the GUI that no Recipient Profile is available the process proceeds to Interactive Recipient Profile Step 240. At this step the Presenter interacts with the system GUI and provides profile information to the system via a dynamically modified sequence of multiple choice questions to efficiently collect demographic information including gender, age, cultural background, religious affiliation, and language. Additional details of this process step required to perform such other interactions with Cross-Cultural Greeting Card System 10 will be described later.

The user completes a "dynamic profile" for the presenter and the recipient. As the presenter begins to fill out either the dynamic profile for herself or her intended recipient, the questions and priority of questions are altered by previous selections (until the profile is complete.) For instance, if a young adult is preparing a birthday card for her parent, the profile questions would be reordered to better match the results provided by the presenter for their own profile. The system assumes that since there is a close family relationship, the presenter and recipient are likely to have similar religious affiliation, ethnic background, and the like. In addition, the questions required for the dynamic profile can be asked in differing sequences depending on the cultural background of the individual being profiled. All dynamic profile questions are multiple choice or are selected from a list as with age or family relationships. Like-wise, the list of occasions such as religious or national holidays would be reprioritized based on the religious or ethnic background of the recipient. For example, if the recipient's religion is Jewish, the priority of holiday celebrations would be rearranged to reduce the ranking of holidays like Christmas and Easter and increase the ranking of holidays like Rosh Hashanah, Yom Kippur, and Hanukkah. This technique reduces the presenter's chances of inadvertently selecting an inappropriate holiday celebration by placing it lower on a list of options and also reduces the presenter's effort in making the selection by reducing the need for or amount of required scrolling, decreasing the required screen area, and providing increased font size. In addition, by presenting the multiple options as dynamically modified scrolling lists behind windows or by pull down menu options, the display screen area can be used efficiently. This becomes more critical with personal portable computational devices, like phones and tablets, which typically have smaller screens and touch screen interfaces.

Social status can be determined or inferred from demographic profile information. For example, in many Asian cultures the elderly are held in high regard, so a birthday card for a Korean male who is turning 70 would take this into consideration. Traditional, classic, and formal templates and components would be prioritized and humorous, casual, and avant-garde styles would be ranked lower. Further, reaching the age of 70 has very specific associated cultural references that have very profound implications that would be unknown to someone from a different culture. The system and method of the current invention can take these "special cases" into account and provide options and explanations to the presenter to convey the relevant cultural and personal implications of the various selections. In addition, appropriate social status of the Recipient can also be determined or inferred by the nature of the event to be commemorated, such as a retirement event or a major career promotion as compared to a personal event such as a birth of a child.

With a Presenter and Recipient Profiles complete the process proceeds to the Presenter/Recipient Profile Comparison Step 250 where the processor compares the individual profiles in order to prioritize greeting card options and elements. When the processing is complete the results are stored. It should be understood that the computational processing can be performed by one or more processors in or associated with Photo Kiosk 20, in the consumer's computational device, remote network accessible processors, or any combination thereof.

At Greeting Options Selection Step 260, the system uses the GUI to present the user with multiple choice type questions to establish the presenter's relationship to the intended recipient, the type of commemoration being recognized, and the emotional intent of the presenter. Options for relationship types would include, but not limited to; business associate, friend, romantic interest, family member, new in-laws, client, employee, supervisor, and so forth. The type of commemoration being recognized can be any sort of official or casual celebration or recognition that can range from a joyous event like the birth of a child, a solemn event such as a death or serious illness, a birthday, an anniversary, a successful business arrangement such as a major sale or merger, or a personal expression of gratitude, sympathy, or congratulations in recognition of a significant event. The emotional intent of the presenter is also prioritized based on the profiles of the presenter and the recipient, and is critical especially if the presenter and recipient are from radically different cultural backgrounds and are of different genders. The system GUI provides warnings and explanations if a culturally inappropriate emotional intent is selected.

At the Profile Results/Greeting Options Comparison Step 270 the processor utilizes the stored cultural comparison information from the Presenter/Recipient Profile Comparison Step 250 and the selected Relationship, Commemoration, and Emotional intent options from the Greeting Options Selection Step 260. The presenter and recipient profiles, selected event type, and emotional intent are used to select the appropriate components and templates from the Look Up Tables.

The processor uses rule sets to classify the available greeting card content and content components into three general categories of evaluation; Positive (+1), Negative (−1) or Neutral (0). The rule sets can be updated, customized by region or demographic, and/or modified based on user feedback, recorded sales, or popularity. As previously described, the rule sets fall into three general categories of evaluation; Positive (+1), Neutral (0), or Negative (−1). Other categorizations with more degrees of rating such as five or ten point systems with the scale divided into positive, neutral, and negative portions can also be used. U.S. application 62/273,641 entitled "Method for Image Product Recommendation" filed on Feb. 11, 2016, which is incorporated by reference in its entirety, describes a method for producing recommendations based on a match score computed between an input profile derived from analysis of an image collection provided by a user, and pre-set product profiles.

When the textual, photographic, and graphic content is created for the production of greeting products, metadata is also created and associated with each card style, design template, component, color, font, graphic, photo, idiomatic phrase, and so forth. This metadata includes, but is not limited to, cultural association, culturally based likely emotional response, recipient age range, recipient gender, casual or formal designations, etc. This metadata can be in the form of numeric values, ontological classifications, or arranged in decision trees. Content components such as depictions of animals, religious symbols, fonts, font colors, stock photographs, or graphic treatments are also tagged with associated metadata and are compared to the results of the rule set classification. Each content item is then ranked and prioritized based on this analysis, for potential use in the intended greeting card product. In addition, metadata associated with each component includes information related to preferred physical layouts, template locations, and placement components on the greeting card product.

Retail and online photo service providers now offer an extensive line of custom printed and virtual greeting cards and greeting products including photo-centric gifts and products including, but not limited to, photo-greeting cards, annotated prints, digital audio visual slideshows and videos, and so forth. It has become commonplace for photo service providers to offer greeting products and gifts, some of which incorporate user supplied photographs. With user supplied photographs for incorporation into the greeting product, image understanding algorithms are used to produce metadata for use with the rule set classification. Image understanding algorithms are able to recognize people, animals, objects, gestures, expressions, and clothing styles, areas and percentage of exposed human skin, produce physical beauty scores, and determine the gender and age of the subject in the photograph. Metadata is generated and associated with the analyzed digital image and would include metadata tags reflective of the identified subject, object, expression, etc. and compatible with the format of the greeting card component metadata and the rule set. The generated metadata associated with a user provided image also includes an indication that the image component was user provided. This is important since in some user exchange scenarios using a user provided image at all would be inappropriate while in other situations incorporating a user provided photographic image would be preferred. Algorithms can be deployed in processors in or associated with the system, or provided by an Application Programming Interface (API) embedded in an application, and image files can be uploaded and processed by remote cloud based systems and the results returned to the current application. For example image files can be received from social media sites e.g. FACEBOOK, INSTAGRAM, TWITTER and the like). Image files therefor can be added (e.g. interfaced with, or uploaded) without being stored on a local memory, thereby increasing convenience and access, as well as options for use in systems of the invention. Image understanding algorithms can be exclusively Artificial Intelligence (AI) based or human operators can be deployed to augment the results from the AI processing. Alternatively, many modern mobile phone camera systems and applications provide this image understanding analysis after a photograph is recorded and the resulting metadata is stored in association with the recorded image file. In addition, consumer provided images are automatically scaled to fit the template associated with a selected greeting card, color corrected for a more pleasing tone, and or digitally altered to be compatible with the card style and or graphic. Well known digital alterations include, but are not limited to, image processing to produce watercolor or oil painting effects, increasing and decreasing color saturation, geometric distortions, converting images to line drawings and sketches, and converting color image to monochrome, sepia, and the like.

At the Content and Component Classification Step 280, the stored Presenter and Recipient profile information and the selected options are used to classify greeting product content and content components into Positive, Neutral, and Negative categories. For example, if the presenter is a young female American and is sending a birthday card to her 70 year old male Korean business associate, card styles that feature formal, traditional, and incorporating Korean styles would receive a Positive (+1) ranking, whereas humorous, casual, and other Asian styles such as Chinese and Japanese would receive a Neutral (0) designation. Since this is a birthday commemoration, "red" and "reddish hued" font colors would all receive a Negative (−1) ranking and if selected would be accompanied with the appropriate warnings. In addition, a color that might be inappropriate for one occasion in a culture may be completely appropriate or even mandatory for another in the same culture.

At the Content and Component Ranking Step 290, items ranked Positive (+1) are given top priority, while Neutral (0) items would be ranked lower, and Negative (−1) items would be eliminated, grayed out when presented via the GUI, and/or would include an appropriate warning message. A plurality of approaches is available for providing audio-visual and/or interactive user feedback about the evaluation of appropriateness of user selections for an intended recipient. The system can simply apply the rules and automatically limit the user's selections. Alternatively, the GUI is used to express a range of "appropriateness" of the various selection options to the user with various indicators such as "gas gages," "Emoticons" with a scale of positive and negative expressions, audiovisual narrated explanations of the cultural implications of the selections, warning symbols such as an exclamation point surrounded by a triangle, a "grayed out" selection, and so forth. The alternative approach affords the user a learning opportunity by also providing context sensitive relevant explanations as to why the selection is inappropriate.

The next step is the Content and Component Preference Step 300, were the resulting priority order of the classified content and content components is further modified based on popularity, purchase history, demographics, and/or regional preferences.

Now that the greeting card product content and components are in priority order, a representation of a preliminary greeting card product is provided to the user at Greeting Card Presentation Step 310, via the system GUI. At optional "More Like This" Step 320, the user can select via the GUI the option to see other very similar card styles and graphic combinations that meet the classification requirements, but may be preferred by the Presenter for personal or aesthetic reasons. The Presenter would retain the option to select the original presented card style or one of the alternatives. At Greeting Selection and Explanation Step 330, the Presenter selects the desired greeting card style which is shown in a larger size and a greeting product type such as, a conventional folded card, postcard, virtual e-card, a poster, print and so on is also selected. In addition, the Presenter is provided with educational material to explain the cultural significance of their selection. At Payment and Production Step 340 the Presenter provides payment via any conventional means. Then, the card is either printed out locally or alternatively, depending on the type of greeting product selected it may be produced at a remote facility or electronically distributed. The resulting product, when completed is sent to a designated destination, using physical or virtual address information provided by the Presenter.

Figure 3A:
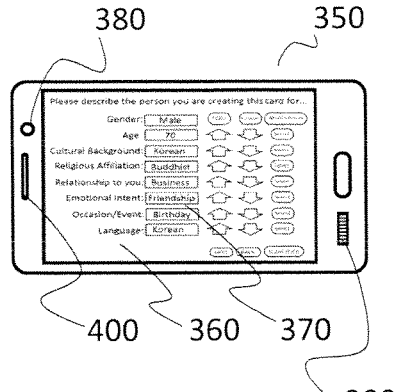
FIG. 3a is a representation of a GUI screen for providing a recipient profile for creating a cross-cultural greeting card depicted on a mobile phone.

Turning now to FIG. 3a, which depicts a representation of a GUI screen for providing a recipient profile for creating a cross-cultural greeting card depicted on a mobile phone. As previously indicated, the present invention can be provided to consumers on either personal computational devices, such as smart phones, tablets, lap top computers, either in a retail venue or remotely. With the use of a Photo Kiosk, a personal computational device can also be used in conjunction with the Photo Kiosk, by providing consumer images to the Photo Kiosk, serving as an alternative GUI for the Photo Kiosk, or acting as terminal to interact with the Photo Kiosk. In addition, a personal computational device can be used to receive a completed virtual Cross-Cultural Greeting Card from the Photo Kiosk, as a "proof" for evaluation, for direct distribution by the consumer, or for later conversion into a hardcopy Greeting Product. Mobile Phone w/Application 350, includes Mobile Phone Touch Screen Display 360 for presenting the GUI and providing a means for interaction. Mobile Phone Application GUI 370 is scaled to fit the smaller screen of Mobile Phone w/Application 350 in addition with smaller screens, not shown, the GUI can include a scrolling and or a zoom in and out feature in order to provide similar GUI interaction options. Operation of the GUI depicted on Mobile Phone Application GUI 370 will be discussed in greater detail later. Mobile Phone Camera 380 is shown on the rear side of the device pointing in the same direction Mobile Phone Touch Screen Display 360 in a so called "selfie" configuration. In this configuration Mobile Phone Camera 380 can be used as a gesture control input device or allows the user to check their appearance and expression while capturing self-portraits for potential use in a greeting card product. In addition, many mobile phones produced today include two cameras, a rear facing camera such as Mobile Phone Camera 380, and a forward facing camera, not shown, used for capturing still photographs and video. Mobile Phone Microphone 390 is provided to record a personal message to be included with the greeting card product, to provide voice-to-text functionality, and or to provide voice commands to control the GUI. Mobile Phone Audio Speaker 400 is used to provide audio feedback such as, instructions, verification and warning words and sounds for use with the GUI, and or review of audio for use in a greeting product or an audio component associated with a greeting product.

Figure 3B:
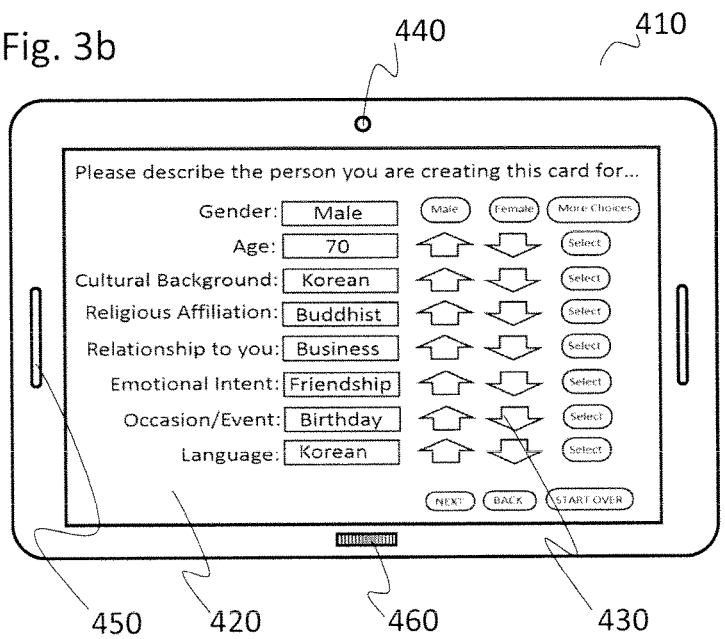
FIG. 3b is a representation of a GUI screen for providing a recipient profile for creating a cross-cultural greeting card depicted on a computer tablet.

FIG. 3b is a representation of a GUI screen for providing a recipient profile for creating a cross-cultural greeting card depicted on a computer tablet. As with Mobile Phone w/Application 350, shown in FIG. 3a, Computer Tablet w/Application 410 is essentially a larger version of a Mobile phone and includes wireless access, similar components and functionality, and includes, a Computer Tablet Touch Screen 420 and Computer Tablet Application GUI 430. As previously described, Computer Tablet Application GUI 430 can be scaled to fit the range of screens sizes that are typically used in computer tablets. Also included are rear facing Computer Tablet Camera 440, Computer Tablet Speaker 450, and Computer Tablet Microphone 460, which all can be used as described in FIG. 3a. Computer Tablet w/Application 410 provides the advantage of being able to depict virtual versions of greeting car product in more detail due to the larger screen size while still being portable enough for the user to practice the invention anywhere at their convenience.

Figure 3C:
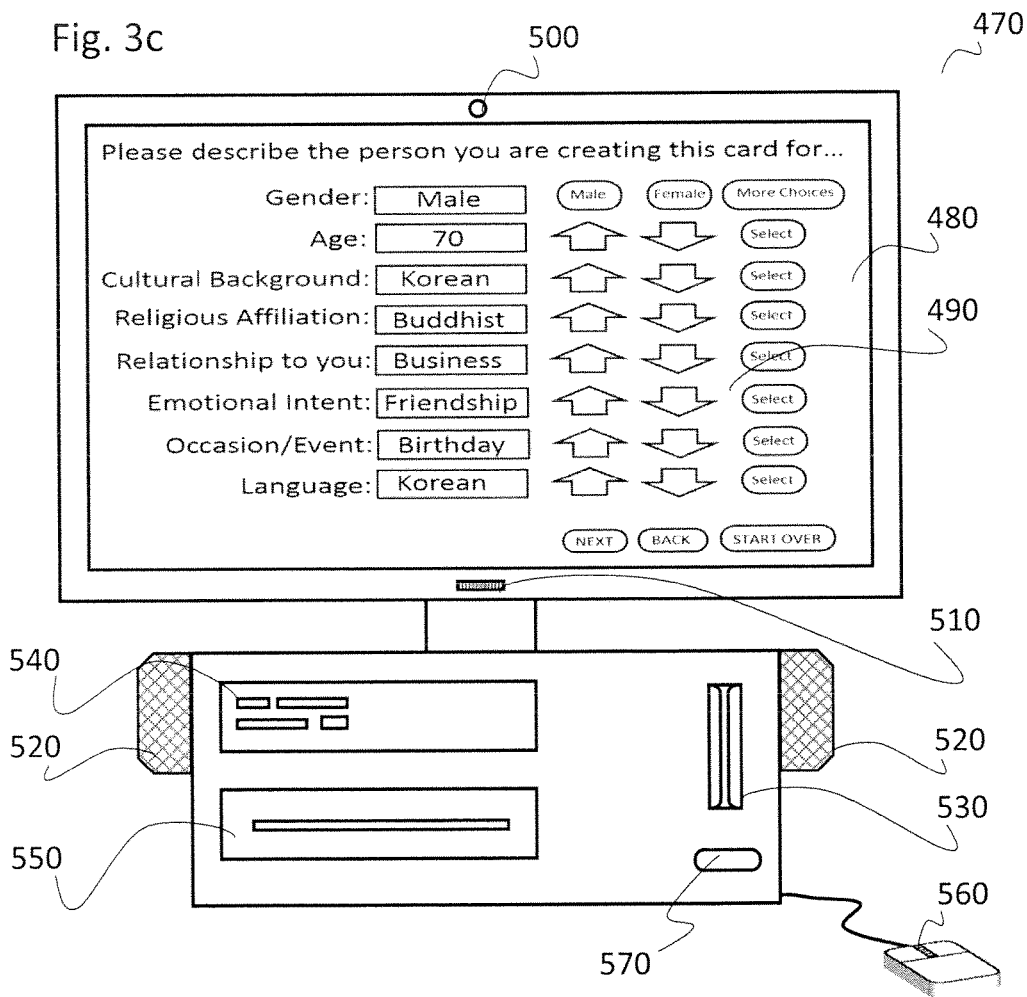
FIG. 3c is a representation of a GUI screen for providing a recipient profile for creating a cross-cultural greeting card depicted on a photo kiosk.

FIG. 3c is a representation of a GUI screen for providing a recipient profile for creating a cross-cultural greeting card depicted on a photo kiosk. As illustrated, Photo Kiosk w/Application 470 can be configured as a desktop computer, laptop, or other suitable computer hardware. Typically Photo Kiosks include cabinetry to protect the components, to provide point of sale marketing communications, such as printed signage or the use of Photo Kiosk Touch Screen 480 to run interactive or looped commercials to encourage user interest in the product, and to configure the Photo Kiosk as a free standing unit for compact retail environments, not shown. Photo Kiosk Touch Screen 480 is used in conjunction with Photo Kiosk Application GUI 490 to provide interactive profile information and to select and review potential greeting card products. Photo Kiosk Camera 500 is used to monitor a user's gestures and expressions for control of the unit and to monitor the user experience, to record images of the user for potential use in a greeting product, and alternatively as a proximity sensor to alert the unit that a user is present. Photo Kiosk Microphone 510 is used to record a personal message to be included with the greeting card product, to provide voice-to-text functionality, and or to provide voice commands to control the GUI. Photo Kiosk Audio Speaker 520 is used to provide audio feedback such as, instructions, verification and warning words and sounds for use with the GUI, and or review of audio for use in a greeting product or an audio component associated with a greeting product. When used in conjunction with Photo Kiosk Touch Screen 480, Photo Kiosk Microphone 510, Photo Kiosk Camera 500, and Photo Kiosk Audio Speaker 520, the user can access a remote live operator to assist with any problems or questions associated with using Photo Kiosk w/Application 470. Photo Kiosk Payment Mechanism 530 is any sort of credit debit card reader, coin changer, or bill acceptor for payment of a hardcopy or virtual greeting card product. Photo Kiosk Payment Mechanism 530 can be used to pay for products produced locally in the retail venue or produced and distributed at a remote facility. Photo Kiosks are placed in retail venues and are designed to service a range of customers possessing many different digital audio video recording devices, various types of storage device formats, and wired and wireless communication means. Photo Kiosk Memory Device Reader/Writer 540 is provided to interface digital audio video recording devices, various types of storage device formats, and wired and wireless communication means in order to support a range of custom requirements. Additionally, Photo Kiosk CD/DVD Reader/Writer 550 is provided to support these alternative memory storage devices. Both Photo Kiosk Memory Device Reader/Writer 540 and Photo Kiosk CD/DVD Reader/Writer 550 are used to obtain digital content files including still images, video images, and audio provided by a user for use in a greeting card product and to provide virtual Cross-Cultural Greeting Card product on a portable digital storage medium. Photo Kiosk Pointing Device 560 can be a conventional wired or wireless mouse, track pad, joystick, electronic stylus and tablet, or the like devices with or without haptic feedback. Photo Kiosk Pointing Device 560 can be configured as an alternative GUI input device for users that may have special physical needs that make conventional pointing devices difficult to use and can include larger buttons or non-slip surfaces and so forth, not shown. Additionally Photo Kiosk Pointing Device 560 can be configured as an electronic stylus and tablet to support users that are more advanced or artistically skilled. Proximity Sensor 570, is optionally included as an alternative to using Photo Kiosk Camera 500 as a proximity sensor to alert the Photo Kiosk that a potential customer is present. When either Proximity Sensor 570 or Photo Kiosk Camera 500 operating as a proximity sensor detect the presence of user any of the following actions are triggered depending on how the Photo Kiosk is configured: an introductory commercial can play, a loop of commercials can stop and the operating mode can start, or a virtual interactive assistant or remote live operator can engage the user and provide assistance.

FIG. 4a is a representation of the Recipient Profile GUI Screen 580 for providing a recipient profile for creating a cross-cultural greeting card. As previously indicated, the present invention can be practiced on any suitable computational platform and created greeting products can be produced locally and or from remote locations. Recipient Profile GUI Screen 580 includes; Recipient GUI Instructions 590 which states, "Please describe the person you are creating this card for . . . " to inform the user to begin the process. Additional instructions, not shown, can be added via links to additional screens, drop down menus, or help screens. The GUI screen is set up in general as "rows and columns" but other well-known GUI interaction modalities such as sequential screens and nested menus can be deployed. Recipient Gender Input section 600 of the GUI screen is arranged in a row with the Recipient Gender Selection Window 610 which shows the user selection which was made using Recipient Male Gender Selection Button 620. In addition, Recipient Female Gender Selection Button 630 would have been used if the Recipient was female. Options can be selected from the GUI via a touch screen, pointing device, speech to text, and or gesture recognition. Also shown is Recipient More Choices Selection Button 640, which is used to reflect the specific gender orientation of the recipient.

Recipient More Choices Selection Button 640 is provided because gender designations require additional sensitivity due to the rapidly changing social norms and mores associated with gender. Another important consideration is the extreme social and legal reactions that some cultures with traditions that encourage social conformity have regarding sexual orientations. Even in progressive societies when a person intends a positive interaction, the use of an apparently innocuous term such as "sexual preference" can cause great unintended offense. Alternatively, the use of what some might consider an offensive term in the proper context can be quite appropriate, such as a humorous card exchanged between close gay friends. There are currently no less than fifty recognized gender and sexual orientation designations but these are not universally accepted across cultures. The Gay & Lesbian Alliance Against Defamation, (GLAAD) produces a "Media Reference Guide" to provide guidance on the proper use of terminology when referencing or addressing members of the Lesbian, Gay, Bisexual, and Transgender (LGBT) community. Preferred terms include "gay," "gay man" or "lesbian," "gay person/people." However, in some Middle Eastern, Asian, African, and Central/South American countries, for example, some sexual orientations are illegal and can result in very extreme punishments, whereas, in many Western Countries sexual orientations are recognized, celebrated, and protected by law. Due to these extreme differences in cultural attitudes regarding sexual orientation it is important to provide a system that recognizes and celebrates range of gay and straight relationships but that is adaptable to accommodate using the present invention in geographic locations where homophobia is a cultural norm and protected by law. So means are provided to change, limit, or omit sexual orientation designations on a regional or geographic basis to comply with local laws, customs, and traditions. This regional configuration can be accomplished at the time of manufacture of the Photo Kiosk, with the inclusion of a GPS system and associated LUT and GUI modifications to automatically configure the Photo Kiosk when they arrive at their intended destinations. Alternatively, the service technician and manually designate the location when installing the unit. Also when used with personal computational devices the application can be modified by the user or the application can interrogate the device to obtain location information and alter the gender orientation options accordingly. As indicated in FIG. 4a, in use the user would press Recipient More Choices Selection Button 640 until the desired Gender orientation designation appeared in the Recipient Gender Selection Window 610.

Turning now to Recipient Age Input section 650, of FIG. 4a, which includes Recipient Age Window 660, Recipient Age Navigation Buttons 670, and Recipient Age Selection Button 680. The user would press up and down arrows of Recipient Age Navigation Buttons 670 until the desired age appears in the Recipient Age Window 660 and the Recipient Age Selection Button 680 is used to select the age. The recipient's age and age differential between the Presenter and the Recipient are also used to sort and filter potential greeting card styles, which will be described in more detail later.

Recipient Cultural Background Input section 690, includes Recipient Cultural Background Window 700 that shows the current selection option to the user and Recipient Cultural Background Navigation Buttons 710 to scroll through a list of potential cultural background options. Cultural background options can be presented in simple alphabetical order or arranged by "most likely" based on regional demographics, previous buying patterns, or arranged by major geographic locations such as Asian, followed by specific regional nationalities such as; Chinese, Japanese, Korean, Vietnamese, and so forth. In this embodiment, the sequence starts with "Asian" and then is followed by Asian countries from most population to least population as a simple surrogate for more complex statistical approaches. Also shown in FIG. 4a, Recipient Cultural Background Selection Button 720, is used to select the option visible in the Recipient Cultural Background Window 700 that was found using the Recipient Cultural Background Navigation Buttons 710. Additionally, as profiles are being filled out, selected options are used to reorder the choice sequence of multiple choice options for subsequent questions. For example; if the card creator operating the system selects "Korean" as the multiple choice option to the "cultural background" question regarding the intended recipient, then the sequence in which the multiple choice answers to the next "religious affiliation" question are reordered so that more likely answers are presented first.

Turning now to the Recipient Religious Affiliation Input section 730, which includes the Recipient Religious Affiliation Window 740, Recipient Religious Affiliation Navigation Buttons 750, and Recipient Religious Affiliation Selection Button 760. As with the previous input sections the user would navigate using the Recipient Religious Affiliation Navigation Buttons 750, until the desired selection option appeared in the Recipient Religious Affiliation Window 740.

As previously described, the priority order of appearance of the Recipient Religious Affiliation options is modified by the results of previous selections. The statistical breakdown for the 53% of people in South Korea that practice religion is approximately 43% Buddhist, 35% Christian, 20% Roman Catholic, with the final 2% made up of Confucianism, Islam, and Korean native religions such Won Buddhism and Cheondogyo. (Source: Korean Culture and Information Service (KOCIS) for 2005). In addition, since the rate of religious practice is relatively low in Korea and in some European countries, "none," "non-practicing," "agnostic," "atheist," and other "non-sectarian" designation options such as "spiritual," "secular humanist," or "naturalist" and so forth would also be provided as selectable options. In this case "Buddhist" and "Christian" are ranked higher and "Islam" and "Confucianism" would be ranked lower because of the likelihood of the latter religions being practiced by a Korean are low. This situation also includes a counter intuitive "special case" unique to the Korean culture and can be incorporated into the rule set. The Asian religion "Shintoism" is practiced by over 80% of the population of neighboring Japan and might be viewed as a logical choice by the Presenter in lieu of the actual information regarding the Recipient's religious beliefs. However, in this specific "special case," Shintoism would be ranked lower than, "Islam" and "Confucianism," since it is an unpleasant reminder of the Japanese annexation of Korea in the early part of the $20^{th}$ Century when the Japanese attempted to impose Shintoism on the Korean people and may be perceived as highly offensive to a Korean national. Detailed explanations for specific special cases of this type can also be presented to the user via the GUI, such as a pop up warning that would accompany the potential selection of Shintoism, such as, "It is very unlikely that a 70 year old Korean male is a member of the Shinto faith, unless you know for sure please make another selection." This represents a case where the user may or may not know the answer to the question and that guidance may help the user make a more appropriate selection. In general, "special cases," in the context of the present invention, represent cross-cultural selection options that could have a significant or profound "positive" or "negative" emotional response from the Recipient and more detailed explanations and guidance are required to ensure that the Presenter is making an informed choice. Special cases are also important because what would appear to be a subtle or trivial detail, such as a randomly selected font color, could cause a great deal of unintended emotional distress in what was an attempt at a positive interaction. Some inappropriate selections are generic and apply to almost anyone from a selected cultural background. Any inappropriate selection options regarding these specific cultural taboos, in the present invention, would appear lower in rank order in a presented navigable list via the GUI, grayed out, or presented with an appropriate "pop up" warning indication such as, "Traditionally, Red font colors are reserved for the Funeral commemorations in the Korean Culture and may be interpreted as an insult if used for a Birthday commemoration."

Colors fall into this category that is modified by the cultural backgrounds. So in the case of a Korean card recipient, once the profile for the recipient has been completed and the presenter is completed the cultural rules are applied. The red hued text font colors would be not be included as options or provided with appropriate warnings since writing someone's name in red in many Asian countries, "red" is associated with death, just as black is associated with death in many Western countries. Red ink looks like blood which is associated with pain and death and in the Korean Culture and when someone passes away, their name is recorded in the family registry and on funeral banners in red ink which is intended to ward off evil spirits. When the name of a living person is written in red, however, superstition and custom infer that the reverse effect occurs, so only the names of the deceased are written in red. Alternatively, if the card is intended to commemorate the death of the recipient then red colored text fonts would be appropriate. So even in the sophisticated technically advanced Korean culture superstitions, folklore, myths, and traditions remain very important. It is a common Korean superstition that if someone's name is written in red, then death or bad luck will come to that person very soon.

Color pallets, fonts, language, language translation options, template, and graphics would be limited by profiles and the occasion, but there would be a manual override with the appropriate warnings such as, "the color you have chosen signifies death in the Korean culture" or "some colors have been omitted since they are reserved for solemn occasions in the Korean culture."

In the case where the Presenter is unsure of the intended recipient's religion, these rules could make automatic selections, or general assumptions omitting potentially offensive choices, low probability choices, and/or limiting choices to those with the lowest probability of causing offense or an inappropriate reaction. Basic demographic information regarding the distribution of various religious belief systems practiced by a cultural group can be used to determine the probability and rank order the potential choices. Even though demographic information regarding populations and regions is readily available, the information must be formatted to be compatible with the Look Up Tables and probabilities assigned based on the demographic breakdown. By combining "demographic probability" with potential positive, neutral, and negative "appropriateness" the best options available, such as high demographic probability and a positive appropriateness, are given a higher rank or are used as a default if the customer is unable to provide the required demographic information.

Turning now to Recipient Relationship Input section 770 which includes Recipient Relationship Window 780 for displaying selection options, Recipient Relationship Navigation Buttons 790 for cycling through the various priority ordered selection options, Recipient Relationship Selection Button 800 for selecting the option presented Recipient Relationship Window 780. This selection step is less complex for the Presenter operating the system since the relationship between the Presenter and the Recipient are well known and understood. Typical relationships include, but are not limited to, Business, Social, Family, Friends, Academic, Clients, Customers, Employer, Employee, and so forth. The Recipient Relationship establishes the context for the next Recipient Emotional Intent Input section 810, and also provides an additional appropriateness check when used in conjunction with Emotional Intent, in that some Relationship types and Emotional Intent combinations are more or less likely than others. For example, if the Presenter selected "Business" or "Employer" as the Relationship type it is unlikely that the Presenter's Emotional Intent would be "Romance" which would as a result be a lower ranked, lower priority selection option.

As with the previous input sections, Recipient Emotional Intent Input section 810, includes Recipient Emotional Intent Window 820 to display the current selection option, Recipient Emotional Intent Navigation Buttons 830 to cycle through the selection options, and the Recipient Emotional Intent Selection Button 840 to confirm and select the emotional intent option displayed Recipient Emotional Intent Window 820. The Emotional Intent selection option provides the presenter with the opportunity to choose the emotional response that the cross-cultural greeting product is intended to elicit. In combination with Presenter provided information the likelihood that the greeting product will achieve this result will increase by avoiding unintentional inappropriate content and by providing culturally and situational content that best communicates the Presenter's intention, regardless of the Presenter's familiarity with the customs and traditions of the intended Recipient. This will be discussed in detail later.

Also depicted in FIG. 4a is Recipient Occasion/Event Input section 850, which Recipient Occasion/Event Window 860 is provided for the user to view the current selection option, Recipient Occasion/Event Navigation Buttons 870 which are used to cycle though various priority ordered selection options, and the Recipient Occasion/Event Selection Button 880 to confirm and select the occasion and/or event option displayed in the Recipient Occasion/Event Window 860. Occasions and Events include personal commemorations common to many cultures such as birthdays, anniversaries, condolences, expressions of sympathy, get well wishes, graduations, congratulations, new job, promotions, weddings, births, business accomplishments, significant personal dates, and so forth. Culturally specific national, religious, traditional, and ethnic holidays and celebrations, change by country, region, religious affiliation, and culture and include examples such as, Hanukah, Ramadan, Christmas, Easter, Holi Festival of Colors, Buddha's Birthday, etc. each having unique features, practices, and sensibilities. When the Presenter uses the Recipient Occasion/Event Input section 850 the list of potential occasions and events are prioritized by the previously provided profile information, all options are not eliminated. The most likely would appear higher on the list while less likely options would appear lower on the list, and inappropriate or culturally insensitive options would be last and include suitable warnings and cautions. For example, if a Canadian woman is sending a card to a Japanese friend, the occasions such as "The 4$^{th}$ of July/American Independence Day," "Halloween" or "Kwanzaa" would be available options but would be much lower in priority as opposed to more likely birthdays, new job, congratulations, and so forth. These "low priority options" would appear further down lists or on subsequent pages of presented options. If the age of the designated Japanese Recipient was input as "20" years old in this example and the greeting product was being created prior to the second Monday in January, the system would make Coming of Age Day (seijin-no-hi) a very high priority option. This option would be highly ranked since on that day all young people who turned 20 in the current year are celebrated on this national holiday in Japan. Even if the Presenter was unaware of this national holiday in Japan and was planning to create a conventional birthday card, this option along with an accompanying explanation as to the nature of the holiday may encourage the Presenter to select it. It is highly likely that the Japanese Recipient of a "Coming of Age Day" greeting product from a Canadian friend would be pleased with the thoughtfulness of the gesture and respect for her cultural heritage and traditions.

Turning now to Recipient Language Input section 890 of FIG. 4a, including Recipient Language Window 900 which is provided for the user to view the current selection option, Recipient Language Navigation Buttons 910 which are used to cycle though various priority ordered selection options, and Recipient Language Selection Button 920 to confirm and select the language option presented in the Recipient Language Window 900. Identifying the native language of the Recipient is important because it provides more detailed information since in many cultures multiple languages are spoken. Providing the specific language of the Recipient helps to identify a cultural sub-group that the Recipient may be a member of and also can be used to create a greeting product that includes text and or audio in the Recipient's native language. If the Presenter chooses to create a greeting card in the native language of the Recipient, a literal translation, in many cases using any of the well know automated language translation software or online services would be inadequate for inclusion in a greeting product. A more appropriate approach than the literal translation of text or words is to identify the appropriate idiomatic phrase that approximates and conveys the sentiments provided by the Presenter. The GUI provides the idiomatic as text and or audio with an accompanying literal translation and an explanation of the idiom for the benefit and education of the Presenter so that they can make an informed choice. This will be discussed in further detail later in the specification. In addition, Recipient GUI Next Button 930 and Recipient GUI Back Button 940 are provided to navigate between screens or to navigate between the input sections. The Recipient GUI Start Over Button 950 is provided in order to allow the user to try the process again if they made a critical error or would like to retry the process after gaining some familiarity with it.

Turning now to FIG. 4b, which is a representation of a GUI screen for providing a creator profile for creating a cross-cultural greeting card. Creator Profile GUI Screen 960 includes Creator GUI Instructions 970 which states, "Please describe yourself as the creator of this card . . . " This instruction can be more detailed and can include additional nested and or linked information on privacy, what the profile information will be used for, and so forth, not shown. If the Creator has used the system before and a stored profile is available, the screen would appear pre-populated with the previously provided information for the user to approve, edit, and/or update. As with the Recipient Profile GUI Screen 580, selection options are ranked and reordered based on the results from previously answered questions.

The Recipient gender information the Creator Gender Input section 980 includes a Creator Gender Selection Window 990 to display the current selected option. Also included Creator Male Gender Selection Button 1000 for use if the Creator is male and Creator Female Gender Selection Button 1010 for use if the creator is female. Also included is the Creator More Choices Selection Button 1020 for additional gender and sexual orientation options. As with the Recipient More Choices Selection Button 640 option, this feature, the available choices, and or whether the button appears on the GUI is determined by information regarding the local or regional laws, customs, traditions, and social mores of where the invention is practiced. The implementation of this feature, can be automated using location information from GPS, cell tower triangulation, and or an identified WIFI network, and rule set or Lookup Table reflecting the local and regional attitudes towards gender and sexual orientations. Alternatively, manual input can be used to provide location information and customized system configurations.

Next is the Creator Age Input section 1030 which includes the Creator Age Window 1040 for displaying the current selection option, Creator Age Navigation Buttons 1050 for cycling through a numerically sequential list of ages, Creator Age Selection Button 1060 to confirm the selection displayed in the Creator Age Window 1040. Knowing the creator's age is important especially if there is large age differential between the recipient and the presenter. Age differential and related implications varies from culture to culture, for example in in many Asian cultures the elderly are revered and treated with respect indicating a more formal, traditional, or austere greeting product whereas in the United States, this is not the norm and a humorous or casual greeting product would be appropriate.

The Creator Cultural Background Input section 1070 includes the Creator Cultural Background Window 1080 to display the current selection option and the Creator Cultural Background Navigation Buttons 1090 to cycle though the various background options. The Creator Cultural Background Selection Button 1100 is used to select and confirm the option displayed in the Creator Cultural Background Window 1080. The Creator Religious Affiliation Input section 1110 includes the Creator Religious Affiliation Window 1120 to display the current selection option, the Creator Religious Affiliation Navigation Buttons 1130 are used to cycle through the rank ordered religious affiliation options, and since the user has provided cultural background information in the previous step, the system can now reorder the religious affiliation options to express the statistical likelihood of the user's religious affiliation. The Creator Religious Affiliation Selection Button 1140 is provided to select and confirm the option displayed in the Creator Cultural Background Window 1080.

The Creator Language Input section 1150 includes the Creator Language Window 1160 to display the current selection, Creator Language Navigation Buttons 1170 to cycle through the rank ordered language selection options, and the Creator Language Selection Button 1180 to select and confirm the option displayed in the Creator Language Window 1160. Also included are the Creator GUI Next Button 1190 to navigate between menus, screens and or sections, Creator GUI Back Button 1200 to undo a previous selection, and Creator GUI Start Over Button 1210 to start the process from the beginning.

It is important to note that the dynamic GUI as depicted in FIGS. 4a and 4b not only changes the presentation sequence of the potential multiple choice answers based on the selected answers to previous questions, but also the questions asked can also be altered. For example, if someone is buying an overseas colleague a "thank you card" for assistance on a project, less detailed or fewer profile questions can be asked. If the presenter's intention is of a more personal nature such as with a solemn funeral commemoration or an expression of sympathy, in response to a serious illness and or if the "cultural differential" is considerable, a more detailed profile with more questions is used. The priority of profile questions is important because the selection options are modified by the previous selections. For instance a wide difference between ethnic, cultural, and religious backgrounds such as casual, believer, fervent of the presenter and the recipient would influence the occasion selection options to generic sentiments or upcoming holidays reflective of the recipient's background. Nationalities, ethnicities, and religious affiliations of the recipient and presenter can be ranked as casual, believer, fervent as with personal relationship between the presenter and recipient such as affection, romantic, professional, business, close relative, distant relative, in-law, friend, associate, client, coworker, supervisor, employee and so forth. Each of these relationship types are modified by ethnicities and religious affiliations of the presenter and recipient.

Whereas the Graphic User Interfaces of the present invention are shown as conventional rows and columns with nested or pop-up menus, the present invention is not limited to these techniques and can use other means such as; touch screen swipes to change options, sequential screens, interactive avatars that ask questions, provide responses, and record selected options, and remote operator mediated GUI interactions.

The user completes a "dynamic profile" for the presenter and the recipient. As the presenter begins to fill out either the dynamic profile for herself or her intended recipient, the questions and priority of questions are altered by previous selections until the profile is complete. For instance, if a young adult is preparing a birthday card for her parent, the profile questions would be reordered to better match the results provided by the presenter for their own profile. The system assumes that since there is a close family relationship, the presenter and recipient are likely to have similar religious affiliation, ethnic background, and the like. In this way the present invention has greater application since it supports and can distinguish between close and distant cultural relationships. In addition, the questions required for the dynamic profile can be asked in differing sequences depending on the cultural background of the individual being profiled. All dynamic profile questions are multiple choice or selected from a list as with age or relationship type. Like-wise, the list of occasions such as religious or national holidays would be reprioritized based on the religious or ethnic background of the recipient.

FIG. 5a is an example of a Look Up Table of potential multiple choice responses to profile questions. Profile Details Look Up Table 1220 includes categories for, Relationship Type Data 1230, Emotional Intent Data 1240, Occasion/Event Type Data 1250, Cultural Background Data 1260, and Religious Affiliation Data 1270. Relationship Type Data 1230 includes the range of interpersonal relationships; including causal types (acquaintance, friend, or neighbor, professional; client, coworker, employee, or supervisor,) and personal or family (close friend, romantic, or relative). For example, these categories help to establish the nature of the relationship and to provide and an overall context in order begin the process of ranking options.

Next is Emotional Intent Data 1240 which provides a means to categorize basic human emotional responses including; joy, fear, sadness, surprise, love, and anger which are, in general, consistent across cultures. A broad category such as "joy" has related subcategories like happiness, amusement, bliss, elation, delight, and cheerfulness, each of which would be linked to the appropriate, culturally specific greeting product content or component to elicit intended specific emotional response. These emotional responses have related and more specific responses that are situational and are caused by different stimuli such as with "joy." A personally created greeting product with beautiful imagery and thoughtful words sent to a dear friend commemorating the birth of a child would elicit "joy" but not "amusement." If the Presenter's Emotional Intent was to elicit "amusement" she would be presented with humorous images and phases.

The lists of emotional responses are stored in a processor accessible database in the form of an emotional response ontology with more broad emotional categories linked to their related more specific emotional responses or dynamically rank ordered by specificity, intensity, or situational appropriateness. Such as with a greeting product to commemorate the birth of a child sent by a young American Woman to close friend who is a young French Woman and intended to elicit "joy." In this case one of the selection options could include a beautiful stylized graphical scene of a woman breastfeeding a newborn. However, this greeting product would not be suitable if the American Woman's friend was from another country such as Saudi Arabia, Taiwan, Hong Kong, Japan, or Bali where breastfeeding in public unacceptable and offensive. The data in the emotional response ontology and metadata associated with the greeting product content and components would reflect these sensitivities. For example, the breastfeeding graphic used in the aforementioned greeting product would have associated metadata tagged "+1" for use to commemorate a birth for a young American, French woman, and other cultures that are comfortable with the practice and would include "−1" tags for women from Saudi Arabia, Taiwan, Hong Kong, Japan, or Bali. In countries where public breastfeeding is tolerated, but not encouraged, such as in the Philippines and Pakistan, the graphic would be tagged with a "0" being neutral for appropriateness.

Greeting products can be stored as templates with interchangeable components including text, language translations, fonts, graphics, colors, a template area reserved for a user supplied photo, and the like to provide a customized product meeting the requirements of the giver and recipient. This would circumvent the need to pre-produce a large number of card graphics in advance, and card could be designed on demand using cultural rules, tagged interchangeable components, and templates. If a user supplied image is provided, image understanding algorithms are used to analyze the provided image for appropriateness. This will be discussed in further detail later.

Emotional response stimuli take many forms and even the most innocuous gestures can cause potentially angry and violent cross-cultural responses. For example, if an American Male was in a bar in Finland and happened to have his arms folded across his chest, it would be considered to be a sign of arrogance and could likely cause a physical confrontation with the local Finnish bar patrons. This example illustrates one of the problems solved by the present invention, in that Finland and America are both progressive Western democracies with many common beliefs and traditions and yet an innocuous gesture in the wrong context or situation can lead to unintended and extremely negative emotional responses even if the intention was benign or even positive. So in this example, if the American Male and his business associates posed for a photograph to include with a greeting product such as a "thank you" card from the American Sales Team for a Finnish Client they happened to have their arms folded in the photograph, which is a normal neutral stance in America, the business relationship may be damaged. Another unfortunate outcome of this example is that the Presenter would unintentionally confirm the stereotypical perception of typical arrogant Americans. This illustrates how stimuli including expressions, gestures, symbols, actions, images, and words can elicit a range of emotional responses which vary greatly across cultures and in specific situations or contexts.

Returning now to FIG. 5a, as previously discussed, these options can be modified on a regional and local basis to conform to local requirements and in addition in regards to Occasion/Event Type Data 1250, these event options are modified by the cultural and or religious background of the recipient and the time of year. In addition to personal spontaneous and recurring events and celebrations that range from joyous to solemn, such as weddings, births, anniversaries, deaths, illnesses, it is common throughout the world to have recurring holidays and celebrations based on national holidays, religious observance, of cultural heritage. These holidays and the traditions that are practiced may be unknown to a person from a different cultural background. Also, the date and more over days used to commemorate events may be based on the Gregorian calendar, the de facto international standard or various Lunar calendars used in Muslim cultures and Lunisolar calendars used in China, the Hindu calendar in India, and the Hebrew calendars which are used for religious and or social purposes. In addition, the Thai solar calendar uses standard western the months and days but the years are still based on the traditional Buddhist calendar. The system of the present invention takes into consideration national, religious, and cultural events and occasions and the calendars used to record when these events occur and provides a conversion to a format typically used by the presenter so that there is no confusion regarding the actual day of the event. In addition to providing the date conversions functionality, appropriate explanations regarding the traditions, history, and significance of the event are also provided. This is also useful since some holidays, such as "Coming of Age Day" (seijin-no-hi) is held on the 2nd Monday of January and the actual date varies from year to year. If an unfamiliar holiday is selected by the user, the actual calendar date is presented to the in the format most convenient and familiar to the user, based on her profile information. This is to accommodate events and occasions that are specific to a region, religion, or culture that the presenter may be unaware of. This would be useful in cases where someone wishes to send a greeting to an old friend from another country, and after completing the profile information the system would identify all of the upcoming holidays, events, and celebrations that are typical for the recipient's cultural and religious background and or appropriate for the Presenter's emotional intent selection. Once the relationship type and emotional intent information are provided to the system, appropriate upcoming events can be rank ordered based on regional popularity and the amount of time before the event takes place, such as temporally closer events would be ranked higher than events father in the future. Events and occasions would include relevant information regarding the event, the related traditions, and customs so that the Presenter can make an informed choice and to better appreciate how the greeting product may affect recipient.

Cultural Background Data 1260 includes information such as national origin, region of the world, ethnicity, race, tribe, and so forth for any designated and recognized cultural group. Cultural Background selection option typically precedes Religious Affiliation Data 1270, since Cultural Background Data 1260 is useful in determining the religious affiliation of both the Presenter and Recipient.

There are many well-known statistical techniques that can be deployed to process the Presenter and Recipient profiles and to classify metadata associated with greeting card styles and components such as techniques presented by K. Fukunaga, in "Statistical Pattern Recognition," 2nd edition, Academic Press, 1990 which teaches many of the known classification and clustering techniques, hypothesis testing, Bayes classifier, kNN algorithm, and so forth. In addition, "Data Mining: Concepts and Techniques," by J. Han, M. Kamber, and J. Pei, 3rd edition, Morgan Kaufmann, 2012, teaches methods for using decision tree, rule-based classification, support vector machines, fuzzy set approaches to information processing including Expert Systems, Artificial Neural Networks, Decision Trees, Machine Learning Algorithms, and or Fuzzy logic. These techniques, can not only be used to process the profile information and component and card metadata, but as users interact with the system, the system can learn and adapt modifying rules and changing rankings based on previous user selections and profile demographic. Fuzzy logic can be used to process recipient and presenter profile data, so that comparisons and ranking of metadata tagged; options, products, templates, and components can be performed and levels of appropriateness determined. The Fuzzy logic approach is based on "degrees of truth" rather than the Boolean logic "true or false" (1 or 0) approach. In extreme cases where a true or false condition can be determined, Boolean logic is used to select or filter out an option. Fuzzy logic is used to consider the various states of truth in between "true or false" so that the result of a comparison between two options can be ranked by degrees of truth. As various potentially appropriate options that have been included for ranking and inappropriate options are discarded by an initial Boolean logic filter, a Fuzzy filter is used to rank the selected options for ranking their relative levels of appropriateness. After rankings occur, adjustable thresholds are used to select and present, to the user, rank ordered options that exceed the adjustable thresholds. Further, adjustable appropriateness thresholds can be preset, set remotely, set by the operator or user. In addition, appropriateness thresholds can be automatically adjusted locally or regionally using location information and or temporally using time/date information. Secondary thresholds can be set to identify "special cases" that require additional consideration, such as informing the presenter of the signification of her potential selection.

Each of the categories illustrated on Profile Details Look Up Table 1220 including, but not limited to Relationship Type Data 1230, Emotional Intent Data 1240, Occasion/Event Type Data 1250, Cultural Background Data 1260, and Religious Affiliation Data 1270 includes dynamically rank ordered data options that can be edited and updated based on any combination of geography, time, user feedback, monitored sales, Presenter profile and or Recipient profile demographics. The Graphic User Interfaces of the present invention are shown in American English, but can be presented in other languages optionally selected by the user. As previously discussed, with each selection made by the user, a first Boolean filter is used to include and to eliminate or rank lower metadata tagged card profile options, cards styles, card components, templates, fonts, colors, and so on. As with the selection of "Client" from Relationship Type Data 1230, items in the next Emotional Intent Data 1240, would be rank ordered so that options such as "Romance" and "Love" have "−1" metadata tags when used in association with "Client" and options such as "Appreciation" and "Good Will" have "+1" metadata tags when used in association with the "Client" Relationship Type Data 1230.

FIG. 5b is an example of a Look Up Table of potential greeting card graphical components and templates that are prioritized in response to profile questions and include, but not limited to Card Component Look Up Table 1280, Font Color Data 1290, Graphic Style Data 1300, Flower Type Data 1310, Symbol Type Data 1320, and Language Type Data 1330. Card Component Look Up Table 1280 is used to select, create, and or configure Component Card Elements Card templates are set up to receive interchangeable "variable data," such as different, graphic styles and treatments, fonts, colors, images, symbols, animals, flowers, and so forth. Card Component Look Up Table 1280 options are also rank ordered based on Presenter and Recipient profiles, the event type, and emotional intent. In addition to metadata indicating appropriateness for different cross-cultural applications, special cases, relationship types, event types, and emotional intents there is also included component metadata indicating compatible templates, colors, graphics, flowers, symbols and so on. For example if "Watercolor" is selected from the Graphic Style Data 1300 and to commemorate the Birthday for a Korean Male Client turning 70 and with the emotional intent of "respect" Flower Type Data 1310, Symbol Type Data 1320, and Language Type Data 1330 would be ranked to reflect that selection. Flower Type Data 1310 includes metadata in order to rank flower types popular in Korean cultures, like Tiger Lilies, Poppies, and Carnations higher and those with specific symbolic meaning in the culture such as "yellow poppies" representing "wealth and success" would be ranked the highest in the category for this event type and emotional intent. As previously mentioned in several Asian cultures such as in Korea and Japan, red font color as shown on the, Font Color Data 1290 column, are reserved for solemn occasions and would be ranked as an extremely unlikely or inappropriate "special case" and would include suitable warning and restrictions. Alternatively, Card Component Look Up Table 1280 is used to select preconfigured greeting products that include the components selected by the customer and are modified with a Presenter's personal message and or image.

Some of the greeting products and greeting product templates are designed to incorporate a user provided photo and or message. This provides the user with the option to customize the card, add a personal photo, and a personal message. These personal photos and messages would be scrutinized by the system to determine appropriateness. In some cases photos in general would be inappropriate, as with a sympathy or funeral card and in those and similar cases the option for including a personal photo would be omitted. If the nature of the card and exchange permitted a personal photograph, the appropriateness of the provided photograph would be determined based on the cultural norms of the recipient. This can be accomplished using image understanding algorithms to analyze a provided image and to determine, pose, clothing style, expression, emotional state, percentage and type of exposed skin, etc. Personal images provided by the presenter for use in the "greeting product" are analyzed for appropriateness pose, apparel, expression, hand gestures, skin exposure, in context with the intended sentiment such as casual dress is inappropriate to commemorate a religious observance but a casual family scene is appropriate for an American Christmas card. Many image understanding algorithms are automated and some use human crowdsourcing to enhance the performance of the algorithms or to manually augment the image understanding when they fail to recognize an object, person, gesture, or expression. These services are available as an application programming interfaces (API), for example, CAMFIND by CloudSight™ and REKOGNITION by Orbeus Inc. and can be integrated into the system and method of the present invention if desired. U.S. Pat. No. 8,692,940 "Method for producing a blended video sequence" may also be used in the system and method of the present invention if desired. Two API cloud based AI Image Understanding systems are PHOTOTIME by Orbeus, Inc. and CAMFIND by CloudSight™.

Alternatively, after the presenter and recipient demographic profile and emotional intent information is provided and saved, the system can provide printed or electronically communicated instructions to the user on how to take an appropriate photograph to be used in conjunction with the greeting card. The instructions can include suggestions on setting, pose, facial expression, and appropriate attire, such as "a hat or head scarf is required," "t-shirts with messages and pictures are inappropriate for this application," "do not cross your arms" or "arm tattoos should be covered" and so forth. As with previous instructions, further descriptions can be provided to the user to explain why a certain expression, pose, or garment would be appropriate or inappropriate. For example, instructions for a Christmas card for an American family friend would suggest a group shot of the presenter's family standing in front of their home and smiling This can also be shown as a draft type physical or electronic card with a surrogate image placed in the card scene as a form of illustration to guide the presenter in taking an appropriate image. In addition, photo realistic and or artistic graphic overlays and backgrounds can be provided to enhance the original photo. For instance, images of snow, snow sculptures, and Christmas decorations can be digitally added to a photo for use with the Christmas card photo. Other types of graphical treatments for photographs and can include national flags, ceremonial or traditional attire, landmarks, popular cultural characters and figures such as "HELLO KITTY" for a Japanese child or "MICKEY MOUSE" for an American child.

Optionally, the user can provide personal images for inclusion in the greeting card product. The images can be still or video images and can be provided to the system either via a wired or wireless connection, a memory card and card reader, a hardcopy scanner, or with a camera integrated or associated with a computational device such as a kiosk, computer, mobile phone, or tablet. Again, once the giver and recipient profiles are complete, and the emotional intent and event type have been selected, the user would be given the option to submit a personal image for inclusion in the greeting product. Once the image is captured, copied, or digitized and made available to the system, the image is evaluated for appropriateness based on the results of the analysis of the profiles, emotional intent, and event type. The user supplied image can be captured live and feedback regarding appropriateness can be provided in real time. Facial expressions, stance, posture, skin exposure, hand gestures, and attire can be analyzed to determine if the photo is appropriate for the selected greeting product and intended recipient. The system can make real time suggestions on improving the photo when captured live such as; "raise your chin," "don't slouch," "smile more," "smile less," and so forth. If a previously recorded image is used, the system can also indicate its appropriateness for inclusion in a greeting product with a numeric or "star" rating system, a "gas gauge" type indicator, or rejection or approval with the appropriate explanations or warnings. Static and dynamic gestures can be used for still and motion hard and soft copy greeting products. These products can include printed still and motion products such as color hardcopy and lenticular motion prints that appear to show moving subjects as the angle of view is changed and virtual still and motion images. As with many aspects of cross-cultural communications, the same gestures using arms, hands, fingers, or head movements and preferences can be positive or innocuous in one culture and great offense in another. For example, as previously mentioned in Finland folding one's arms in a public place, such as a bar, is seen as arrogant and a challenge that could instigate a physical confrontation. In Greece and Bulgaria nodding your head indicated "no" and shaking your head indicates "yes" and in the West these gestures have the opposite meaning.

As described, when user provided images are used with a kiosk, phone, or tablet equipped with a camera, the system can provide guidance and examples to instruct the user in how to capture an image that would be appropriate. In addition, appropriate graphical treatments can be provided and include still or dynamic decorative boarders, artistic effects, and foreground and background graphical or photo-realistic imagery that would be appropriate for the recipient. In addition, these afore mentioned techniques can be augmented with the use of a "Chroma-key" or "green screen" backdrop or use of a two image capture technique as taught in U.S. Pat. No. 5,914,748 Method and apparatus for generating a composite image using the difference of two images, which is incorporated by reference. When used in conjunction with a camera, these techniques facilitate adding a photo-realistic or graphical digital replacement backgrounds to the user provided or posed image. These can be presented to the user as templates with graphical foreground, background, border artwork, and real-time virtual presentations for selection by the user and to visualize how the final image will appear. U.S. patent application Ser. No. 14/457,292, Titled: "System For Producing Compliant Facial Images For Selected Identification Documents," which provides techniques for appropriate pose and expression composition to conform to local or regional I.D. photo requirements and U.S. patent application Ser. No. 14/685,133, Titled: "Automatically Generated Visual Annotated Graphic Legend," which provides techniques to digitally identify and extract subjects from images and to add graphical information are herein incorporated by reference.

As previously described, the computer processed presenter and recipient profiles, emotional intent, and event information are used to provide a "cultural context" for evaluation of metadata tagged greeting products and components. This information is used in conjunction with automatic and or operator augmented image understanding algorithms to evaluate the appropriateness of user provided photographs for inclusion in the greeting product. The same approach applies to user provided text and audio obtained from speech to text systems and text input from pointing devices. The user input is evaluated for appropriateness. Personal statements, recorded audio, and text provided by the presenter for use in the greeting product are analyzed for appropriateness and screened for non-translatable idiomatic phases, taboo terms, impolite or personal questions, unintentionally rude comments, overly casual or formal language, and or comments that could be interpreted as suggestive and or sexual in nature. Automated translation systems are incorporated in the system of the present invention or provided via remote service providers. These automated systems can be augmented by the use of trained or "crowd sourced" human operators. Additional details on languages, language translation, and idiomatic phase translations will be provided later.

Figure 6A:
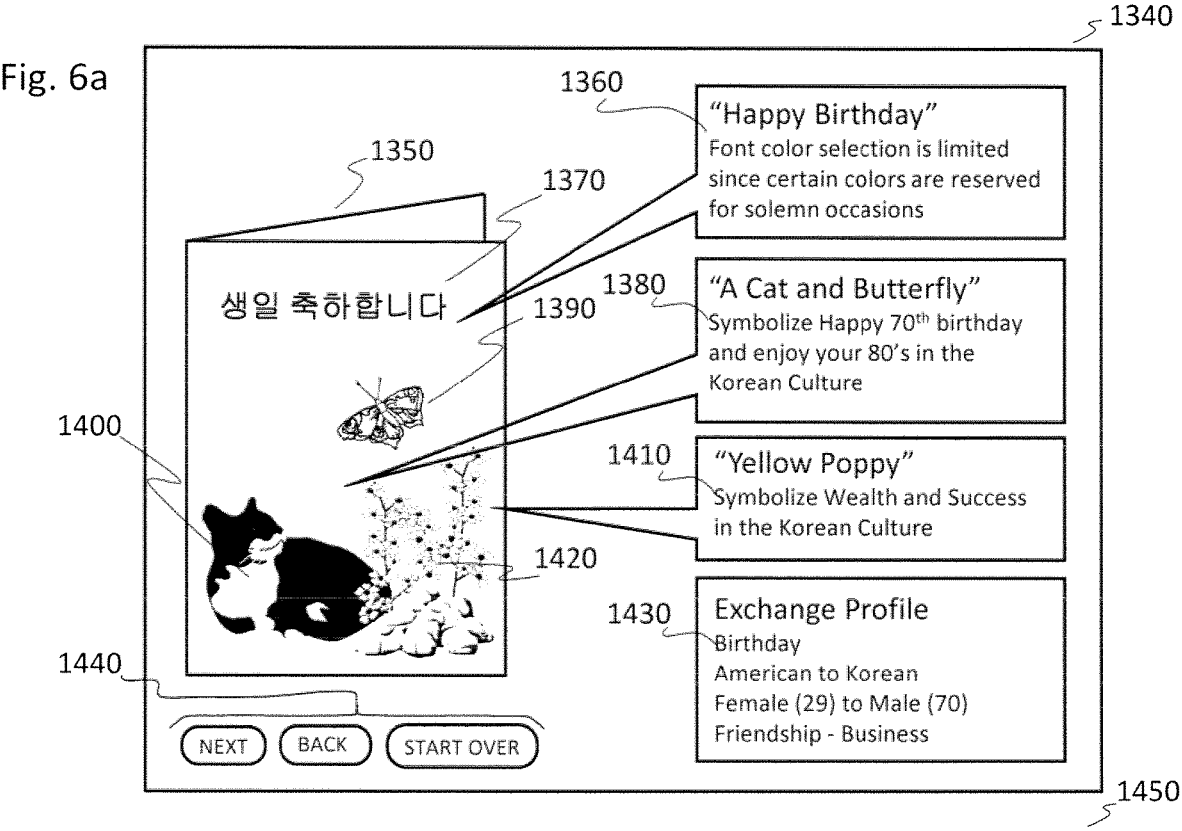
FIG. 6a is a is a representation of a GUI screen for presenting the front surface of a cross-cultural greeting card and a detailed explanation of the intended meaning of the text and graphics.

Turning now to FIG. 6a, a representation of a GUI screen for presenting the front surface of a cross-cultural greeting card for user evaluation and a detailed explanation of the intended meaning of the text and graphics. Greeting Card Review GUI 1340 depicts a graphical representation of a partially opened greeting card product showing the Front View of Greeting Card Representation 1350. Whereas this depiction shows a conventional folded greeting card, the present invention is not so limited. Any physical or virtual product including text, graphics, and or images used to recognize or commemorate an event and to convey or elicit an intended emotion can be produced using the present invention. The greeting product is shown as an oblique projection but other suitable illustration techniques such as video representations and rendered objects that would allow the user to rotate the image in space can also be used.

Included in Greeting Card Review GUI 1340 is Translation and Font Color Description 1360 which is shown as a text box with a "speech bubble"-like graphic pointing to the relevant portion of the Front View of Greeting Card Representation 1350, the Greeting Card Cover Text 1370, which is written in the Korean using the Hangeul alphabet. It should be noted that most modern Korean literature and informal writing is written entirely in Hangeul alphabet, however official documents and academic papers are often written in a mixture of Hangeul and Hanja, so in this case, since the greeting card is not a formal document, Hangeul is an acceptable form of writing to use. Translation and Font Color Description 1360 provides the English translation for the Korean Greeting Card Cover Text 1370 and it is shown as "Happy Birthday" with the addition of the explanation "Font color selection is limited since certain colors are reserved for solemn occasions" in order to educate and or inform the user.

In addition, the Front View of Greeting Card Representation 1350 includes Butterfly Interchangeable Graphic Component 1390, Cat Interchangeable Graphic Component 1400, and Flower Interchangeable Graphic Component 1420. These components are designed to fit in predetermined locations on the Front View of Greeting Card Representation 1350 which acts as a template to receive text and graphic components. Text and graphics components are automatically scaled to fit various greeting product formats and templates and font size automatically changes within set ranges to accommodate different length messages and various font styles. These interchangeable components provide the user with additional creative control without altering the appropriateness, meaning, or emotional intent of the greeting product. This will be discussed in additional detail later in the specification. Each interchangeable graphic component and in this case, their combined significance is explained with overlaid text and graphics, including Graphic Symbol Description 1380 which includes a speech bubble graphic and the message: "A Cat and Butterfly" and the description to educate presenter, "Symbolize Happy $70^{th}$ birthday and enjoy your 80's in the Korean Culture." Alternatively and/or additionally, multiple pre-formed digital cards of various formats representing variations on the same theme with locations for adding variable text can be provided. The Flower Interchangeable Graphic Component 1420 provides another opportunity to enhance the emotional significance and specificity of the greeting product since different flower species and colors symbolize and represent various emotional intents in different cultures. Such as in the United States and other Western countries, Red roses are typically seen as an expression of love and or affection. The Flower Interchangeable Graphic Component Description 1410 uses the same type of speech bubble graphic to indicate what component graphic element it is describing. In this case Flower Interchangeable Graphic Component Description 1410 is pointing to Flower Interchangeable Graphic Component 1420, which it describes as "Yellow Poppy," with the additional explanation "Symbolize Wealth and Success in the Korean Culture." This graphic component could be exchanged for another flower type that conveyed or attempted to elicit an emotion that was compatible with the presenter's emotional intent and the recipient's profile, but more or less specific or emphasizing a different emotional aspect such as a tiger lily symbolizing pride or wealth in the Korean culture. The user interacts with the interchangeable graphic components by any suitable means such as touching the graphic element via a touch screen to cycle through the compatible options presented with their individual explanations until the desired option is presented. Exchange Profile Review 1430 provides the user with basic profile information for the presenter and recipient and the type and nature of the event and relationship. As indicated the greeting product is from a 29 year old Female Business associate to her 70 year old Male Korean Client to commemorate his birthday and to convey friendship.

In some cases, images have subtle, symbolic, but very important meanings. For example, in the Korean culture, when a picture of a cat includes a butterfly, as depicted on Front View of Greeting Card Representation 1350, it symbolizes longevity, but more specifically this classic image of a cat watching a butterfly is meant to commemorate a 70th birthday and a wish for the recipient to enjoy their 80's. The system and method of the present invention identifies these "special cases" and adjusts Look up Table thresholds and ranking priorities to ensure these options are presented to user for consideration. If this image was on a birthday card and selected by a non-Korean for a Korean acquaintance, the subtlety and meaning would not be apparent to the giver, if no explanation is provided and could even be considered insulting if the recipient was much younger than 70 years old. The system also provides the user with additional personalization options such as suggesting the option of exchanging an interchangeable graphic element, such as Cat Interchangeable Graphic Component 1400 for a user provided image of the a cat variety that had personal significance to the recipient such as a cherished pet cat that was a black cat instead calico cat depicted. Alternately, access can be provided to searchable remote or third party sources of graphic elements, stock images, video clips, and audio clip that can be provided to the user free or at additional costs. In the case described, if the intended recipient was coincidentally turning 70 a deeply meaningful sentiment would be conveyed without the true appreciation of the presenter, who may have in other circumstances selected it for its overall oriental style and appearance only.

Explanations can be provided with the selection or linked to the selection as a nested option for viewing if desired. This can be an operator or user set feature if "more or less" information is required. A learning opportunity of this sort benefits the presenter by providing an insight to the presenter of the cultural significance of an appropriate selection and to inform the presenter why certain selections that seem innocuous are inappropriate.

Also provided are Greeting Card Review GUI Navigation Buttons 1440, which include "Next," "Back," and "Start Over," to allow the user to navigate in and out of Greeting Card Review GUI 1340, to start the process over, go the previous GUI screen, or go the next GUI screen.

Figure 6B:
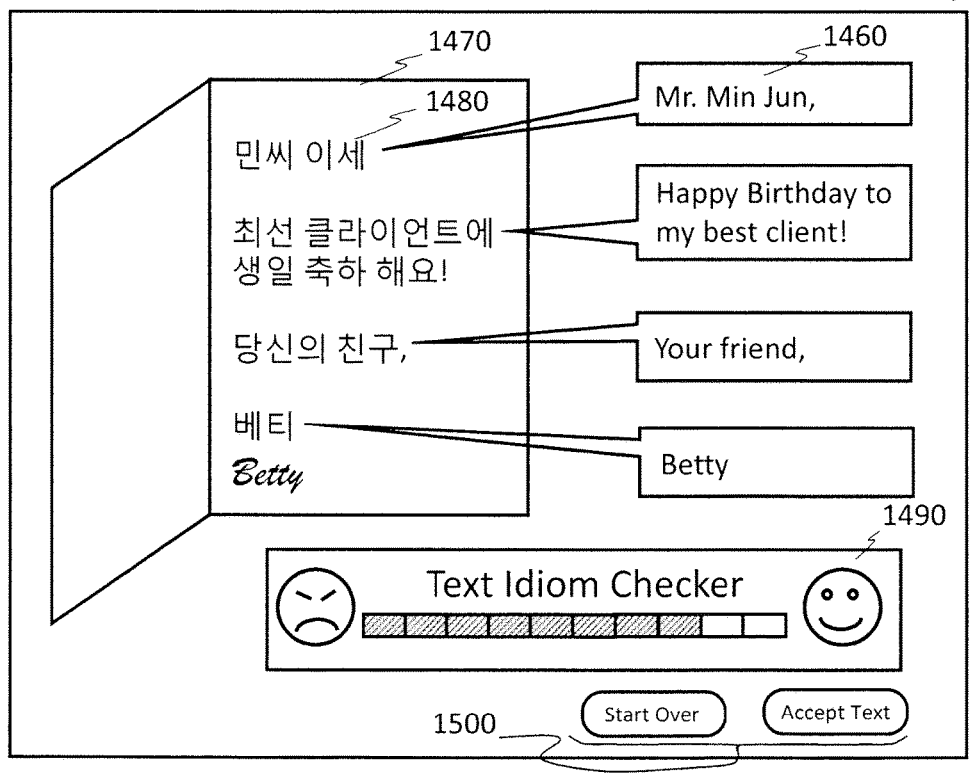
FIG. 6b is a is a representation of a GUI screen for presenting the interior surface of a cross-cultural greeting card and a detailed explanation of the intended meaning of the idiomatic phrasing.

Turning now to FIG. 6b, which provides a representation of a GUI screen for presenting the interior surface of a cross-cultural greeting card and an explanation of the intended meaning of the idiomatic phrasing. Included in Interior View of Greeting Card Representation 1450 GUI is Interior View of the Greeting Card 1470 which is used to show a concealed portion of multi-surface greeting product such as the folded card as shown, a multipage photo album, or a conventional custom postcard which has a front image surface and a back surface with a location for postage, a personal text message, a mailing and return address. This GUI screen, in general, is used to provide, edit, and or review any additional personal content contained in the physical and or virtual greeting product. Translated Text 1480 is depicted in the Korean Hangeul alphabet and Interior Card Text Translation 1460 include the previously described "speech bubble" graphics with the English equivalent phrases including "Mr. Min Jun," "Happy Birthday to my best client!," "Your friend," and "Betty." In addition the term "Betty" is depicted not only in the Korean Hangeul alphabet, it is also depicted in English with a user selectable appropriate script font. Optionally, a space can be provided for a hand written signature or signatures.

In addition to culturally appropriate idiomatic phrases translation options and direct "word for word" would be available via a manual override option, not shown, with the appropriate cautions and warnings. The preferred approach is for the user to provide a statement and the system would find a suitable pre-stored translated phrase matching the content and intent of the provided phase an in the language of the intended recipient. This is to avoid grammatical and idiomatic errors associated with word for word translations. In addition, the processed information from emotional intent and event being commemorated are used in conjunction with users provided text to make an appropriate selection. As previously mentioned, the user can provide or select text phrases to the system with any suitable pointing device or audio based speech to text system supported by the computational platform in use. The presenter would use their native language to provide a statement and this would be used to find the most appropriate corollary phase in the recipient's native language. This would be in light of the profiles, occasion, etc. to limit the list to relevant meaningful statements. Phonetic pronunciations could also be provided to the presenter if she also wishes to hear how the statements will sound or as a pronunciation guide for a virtual or physical greeting product with sound. Also included is a language translator that uses the presenter's native language and both presenter and recipient profiles to find appropriate pre-stored sentiments and phases to include on the "inside of the card" or other modalities to incorporate a personal message. These would appear on the GUI user screen with idiomatically corrected translations and explanations for the presenter to review. The presenter would type or say something like, "Happy Birthday, to my dear friend Mr. Min Jun!" which would be used to find an appropriate Birthday Greeting in light of the profile information. Also the presenter would have the option to use the translator for literal translations, with the appropriate warnings provided by the GUI.

For example, the Spanish idiomatic phrase; 'Hace mucho frío' has the literal English translation, 'It makes much cold' but its true meaning to a Spanish speaker is 'It is very cold.' With the present invention, the user would type, select or speak the phase, 'It is very cold' in English which would be used to select the idiomatic phrase 'Hace mucho frío.' For this example the user could be provided with the literal translation with an explanation of the idiom. A Spanish speaker would have the same experience by saying or typing 'Hace mucho frío' would be translated to the appropriate English phrase 'It is very cold' with the appropriate explanations presented.

Also depicted in FIG. 6b is Idiomatic Phase Checker Graphic 1490, which shows a graphic representation of the system's ability to match the user provided phrases with available relevant translated idiomatic phrases. Whereas the graphic indicator depicted in Idiomatic Phase Checker Graphic 1490 is represented as a metaphoric "gas gage" and suitable indicator such as a star system, good-better-best indicator, or text messages such as "well done" or "please rephrase your message." Greeting Card Interior Text GUI Navigation Buttons 1500 are provided to allow the user to accept the input text and idiomatic translations and proceed to the next screen and step in the system workflow or to start the process of providing a personal message over.

Figure 7A:
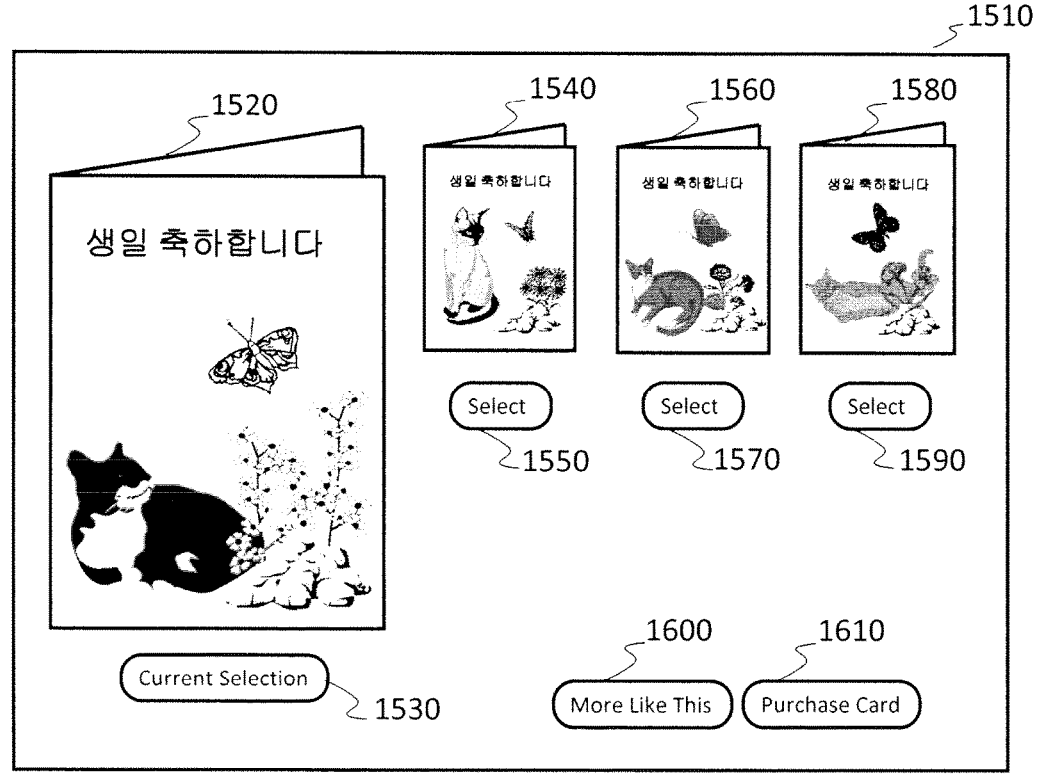
FIG. 7a is a representation of a GUI screen for presenting the front surface of a cross-cultural greeting card and a series of three equivalent alternatives from which to select.

Turning now to FIG. 7a, a representation of a GUI screen for presenting the front surface of a cross-cultural greeting card and a series of equivalent alternatives to select from. Upon completion of the card the customer is directed to the Presentation GUI 1510. There she will see a representation of the front surface of the card she has just completed, Original Completed Greeting Card Representation 1520, along with three other similar alternative card styles; Alternative Greeting Card 1 Representation 1540, Alternative Greeting Card 2 Representation 1560, and Alternative Greeting Card 3 Representation 1580. The Presentation GUI 1510 is shown with three alternative card styles, all of which have similar Cross-Cultural content, intent, and verbiage. The basic selected graphic components of a "cat," "butterfly," and "flowers" from the Original Completed Greeting Card Representation 1520, have been maintained for the Alternative Greeting card styles but feature different styles/types/ colors of cats, butterflies, and flowers. In an alternative embodiment the alternative card styles 1540, 1560, and 1580 are not composed of individual graphic components, but are stored as graphical templates with interchangeable text. The customer is provided with Current Selection Button 1530, if the Original Completed Greeting Card Representation 1520 is acceptable and Alternative Greeting Card 1 Selection Button 1550 to select Alternative Greeting Card 1 Representation 1540, Alternative Greeting Card 2 Selection Button 1570 to select Alternative Greeting Card 2 Representation 1560, and Alternative Greeting Card 3 Selection Button 1590 to select Alternative Greeting Card 3 Representation 1580. Although FIG. 7a depicts one original greeting card and three alternatives, the present invention is not so limited, a single alternative style can be shown with numerous alternatives. If the Original Completed Greeting Card Representation 1520 and the presented alternatives are unacceptable to the customer an additional "More Like This" Selection Button 1600, is provided. The "More Like This" Selection Button 1600, can be configured just to replace the 1 or more of the Alternative Greeting Cards 1540, 1560, or 1580. If an alternative card is selected using any the Alternative Selection Buttons 1550, 1570, or 1590 the corresponding selected card takes the place of Original Completed Greeting Card Representation 1520 to provide a better viewing option for the user and informing the system about the current selection. As previously described each alternative card design would include appropriate explanations of the subtle distinctions between the various card designs, not shown.

At the Presentation GUI 1510 screen the customer can select the Optional "More Like This" Selection Button 1600 or Purchase Card Button 1610. A selection of cards would be presented to the user for selection with a "more like this" option. The "more like this" option would present a new series of similarly derived cards with different graphics, colors, and fonts, but all conveying the same intent. If the customer is satisfied if the Original Completed Greeting Card Representation 1520 she would use the Current Selection Button 1530 and the Purchase Card Button 1610 to proceed to the next screen in order to purchase the card.

Figure 7B:
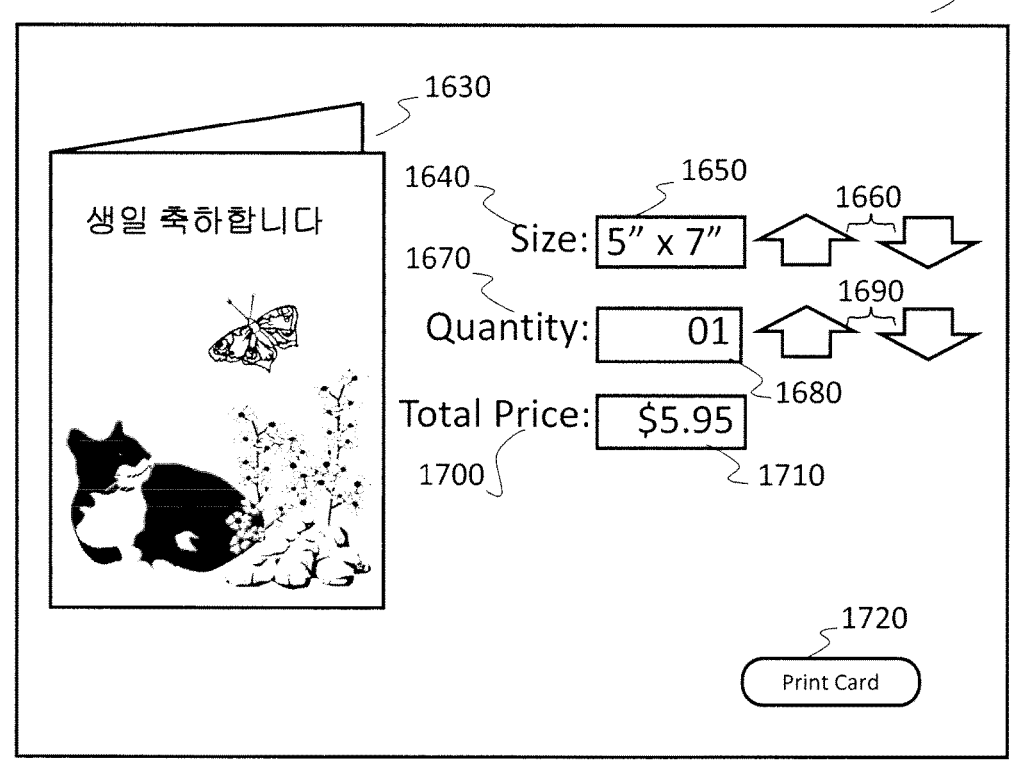
FIG. 7b is a representation of a GUI screen for presenting the front surface of a cross-cultural greeting card and for conducting a transaction.

FIG. 7b is a representation of a GUI screen for presenting the front surface of a cross-cultural greeting card, selecting the format and number of greeting products, and conducting a transaction. Greeting Card Transaction GUI 1620 includes Completed Greeting Card Representation 1630, Greeting Card Size GUI 1640, Greeting Card Size Window 1650, Greeting Card Size Navigation Buttons 1660, Greeting Card Quantity Input 1670, Greeting Card Quantity Window 1680, Greeting Card Navigation Buttons 1690, Total Price Indicator 1700, Total price Window 1710, Print Card Button 1720.

Optionally for hardcopy greeting products the system can also provide card envelope and or packaging that would also be selected or printed with an appropriate style, color, and or graphic design including items such as special envelopes and accessories like ribbons, bows, stickers, custom pattern printed envelopes, and so forth. Depending on the background of the recipient, presentation instructions may also be provided, including indications of the preferred form and format of the greeting card product for the given exchange situation, such as a hard copy card for condolence to a close associate and a virtual e-card for a birthday for a casual friend. The presenter would optionally also receive a printed or virtual copy of the produced keepsake with the appropriate annotated explanations and descriptions of the symbolic meaning of the text and graphics of the selected card.

The system and method of the present invention can be practiced as a stand-alone application on a retail kiosk, as an application on a personal computational platform, including local and or remote fulfillment and distribution, as a remote internet browser accessible service, and or used as an feature on content rich interpersonal social networks such as FACEBOOK and GOOGLE+ and business networks such as LINKEDIN, BRANCHOUT, or MEETUP. These venues provide an additional opportunities to meet and form relationships that transcend international and cultural boundaries. The present invention can be implemented as an application integrated into existing social and business networks.

The "greeting cards" and related "greeting products" that are produced as physical products and printed on any suitable digital printer such as Thermal Dye Sublimation, Electrophotographic, Digital Photo Printer, or Inkjet printer or can be produced as a virtual product for electronic distribution. A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

10 Cross-Cultural Greeting Card System
20 Photo Kiosk
30 Touch Screen Display
40 Camera
50 Physical Media Connectors
60 Card Reader
70 Microphone
80 Pointing Device
90 Two-way Wireless Connection
100 Mobile Phone
110 Greeting Card Graphic
120 Printed Greeting Card
130 Digital Printer
140 Large Format Digital Printer
150 CD/DVD Reader/Writer
160 Hardcopy Scanner
170 Wireless Router
180 Remote Production Facility
190 System Flowchart
200 Initialization Step
210 Customer Profile Decision Step
220 Interactive Presenter Profile Step
230 Recipient Profile Decision Step
240 Interactive Recipient Profile Step
250 Presenter/Recipient Profile Comparison Step
260 Greeting Options Selection Step
270 Profile Results/Greeting Options Comparison Step
280 Content and Component Classification Step
290 Content and Component Ranking Step
300 Content and Component Preference Step
310 Greeting Card Presentation Step
320 Optional "More Like This" Step
330 Greeting Selection and Explanation Step
340 Payment and Production Step
350 Mobile Phone w/Application
360 Mobile Phone Touch Screen Display
370 Mobile Phone Application GUI
380 Mobile Phone Camera
390 Mobile Phone Microphone
400 Mobile Phone Audio Speaker
410 Computer Tablet w/Application
420 Computer Tablet Touch Screen
430 Computer Tablet Application GUI
440 Computer Tablet Camera
450 Computer Tablet Speaker
460 Computer Tablet Microphone
470 Photo Kiosk w/Application
480 Photo Kiosk Touch Screen
490 Photo Kiosk Application GUI
500 Photo Kiosk Camera
510 Photo Kiosk Microphone
520 Photo Kiosk Audio Speaker
530 Photo Kiosk Payment Mechanism
540 Photo Kiosk Memory Device Reader/Writer
550 Photo Kiosk CD/DVD Reader/Writer
560 Photo Kiosk Pointing Device
570 Proximity Sensor
580 Recipient Profile GUI Screen
590 Recipient GUI Instructions
600 Recipient Gender Input
610 Recipient Gender Selection Window
620 Recipient Male Gender Selection Button
630 Recipient Female Gender Selection Button
640 Recipient More Choices Selection Button
650 Recipient Age Input
660 Recipient Age Window
670 Recipient Age Navigation Buttons
680 Recipient Age Selection Button
690 Recipient Cultural Background Input
700 Recipient Cultural Background Window
710 Recipient Cultural Background Navigation Buttons
720 Recipient Cultural Background Selection Button
730 Recipient Religious Affiliation Input
740 Recipient Religious Affiliation Window
750 Recipient Religious Affiliation Navigation Buttons
760 Recipient Religious Affiliation Selection Button
770 Recipient Relationship Input
780 Recipient Relationship Window
790 Recipient Relationship Navigation Buttons
800 Recipient Relationship Selection Button
810 Recipient Emotional Intent Input 820 Recipient Emotional Intent Window
830 Recipient Emotional Intent Navigation Buttons
840 Recipient Emotional Intent Selection Button
850 Recipient Occasion/Event Input
860 Recipient Occasion/Event Window
870 Recipient Occasion/Event Navigation Buttons
880 Recipient Occasion/Event Selection Button
890 Recipient Language Input
900 Recipient Language Window
910 Recipient Language Navigation Buttons
920 Recipient Language Selection Button
930 Recipient GUI Next Button
940 Recipient GUI Back Button
950 Recipient GUI Start Over Button
960 Creator Profile GUI Screen
970 Creator GUI Instructions
980 Creator Gender Input
990 Creator Gender Selection Window
1000 Creator Male Gender Selection Button
1010 Creator Female Gender Selection Button
1020 Creator More Choices Selection Button
1030 Creator Age Input
1040 Creator Age Window
1050 Creator Age Navigation Buttons
1060 Creator Age Selection Button
1070 Creator Cultural Background Input
1080 Creator Cultural Background Window
1090 Creator Cultural Background Navigation Buttons
1100 Creator Cultural Background Selection Button
1110 Creator Religious Affiliation Input
1120 Creator Religious Affiliation Window
1130 Creator Religious Affiliation Navigation Buttons
1140 Creator Religious Affiliation Selection Button
1150 Creator Language Input
1160 Creator Language Window
1170 Creator Language Navigation Buttons
1180 Creator Language Selection Button
1190 Creator GUI Next Button
1200 Creator GUI Back Button
1210 Creator GUI Start Over Button
1220 Profile Details Look Up Table
1230 Relationship Type Data
1240 Emotional Intent Data
1250 Occasion/Event Type Data
1260 Cultural Background Data
1270 Religious Affiliation Data
1280 Card Component Look Up Table
1290 Font Color Data
1300 Graphic Style Data
1310 Flower Type Data
1320 Symbol Type Data
1330 Language Type Data
1340 Greeting Card Review GUI
1350 Front View of Greeting Card Representation
1360 Translation and Font Color Description
1370 Greeting Card Cover Text
1380 Graphic Symbol Description
1390 Butterfly Interchangeable Graphic Component
1400 Cat Interchangeable Graphic Component
1410 Flower Interchangeable Graphic Component Description
1420 Flower Interchangeable Graphic Component
1430 Exchange Profile Review
1440 Greeting Card Review GUI Navigation Buttons
1450 Interior View of Greeting Card Representation GUI
1460 Interior Card Text Translation
1470 Interior View of the Greeting Card
1480 Translated Text
1490 Idiomatic Phase Checker Graphic
1500 Greeting Card Interior Text GUI Navigation Buttons
1510 Optional "More Like This" Presentation GUI
1520 Original Completed Greeting Card Representation
1530 Current Selection Button
1540 Alternative Greeting Card 1 Representation
1550 Alternative Greeting Card 1 Selection Button
1560 Alternative Greeting Card 2 Representation
1570 Alternative Greeting Card 2 Selection Button
1580 Alternative Greeting Card 3 Representation
1590 Alternative Greeting Card 3 Selection Button
1600 Additional "More Like This" Selection Button
1610 Purchase Card Button
1620 Greeting Card Transaction GUI
1630 Completed Greeting Card Representation
1640 Greeting Card Size GUI
1650 Greeting Card Size Window
1660 Greeting Card Size Navigation Buttons
1670 Greeting Card Quantity Input
1680 Greeting Card Quantity Window
1690 Greeting Card Navigation Buttons
1700 Total Price Indicator
1710 Total price Window
1720 Print Card Button

The invention claimed is:
1. A method for providing a greeting product, comprising:
interactively identifying, by a computer processor, a first profile for a presenter, the first profile stored on a remote storage and comprising demographic information for the presenter;
the processor interactively identifying a second profile for a recipient, the second profile stored on the remote storage and comprising demographic information for the recipient;
the processor comparing the demographic information of the first profile to the demographic information of the second profile;
receiving, at the processor, an indication from the presenter of a relationship between the presenter and the recipient, a commemoration, and an emotional intent;
the processor classifying available greeting product content components according to categorizations with degrees of rating based on the indications of relationship, commemoration, and emotional intent from the presenter;
the processor prioritizing the greeting product content components in accordance with the categorizations from most prioritized to least prioritized;
the processor presenting the greeting product content components in the prioritized order to the presenter via a graphic user interface, presenting instructions to the presenter via the graphic user interface to guide the presenter in providing a culturally appropriate photograph for the greeting product options, and providing an interactive selection process for the greeting product options, wherein the interactive selection process makes real time suggestions to improve the greeting product options and provides a warning message if a culturally inappropriate greeting product option is chosen; and
printing a hardcopy version of a selected greeting product or using a communication network to transmit a softcopy version of the selected greeting product to a selected destination.

2. The method of claim 1 wherein presenting the greeting product options via a graphic user interface includes a "more like this" capability.

3. The method of claim 2 wherein the "more like this" capability comprises a new set of greeting product options using greeting product components similar to greeting product components in the greeting product options presented to the presenter.

4. The method of claim 3 wherein the greeting product components are selected from the group consisting of: modifications to color hues, font types, font sizes, a rewording of the text, and different styles of the selected icons, symbols, scenes, or characters.

5. The method of claim 1 wherein the greeting product options are presented to the presenter including descriptions of each greeting product option.

6. The method of claim 5 wherein the greeting product options are presented to the presenter including instructions on how to present the greeting product to the recipient.

7. The method of claim 5 wherein the descriptions indicate when any one of the greeting product options includes a special case that could cause an extremely positive or negative emotional response from the recipient.

8. The method of claim 1 further comprising the processor translating a user provided phrase in a first selected language and searching for an idiomatic phrase conveying the same sentiment in a second selected language.

9. The method of claim 8 further comprising the processor providing the idiomatic phrase conveying the same sentiment in the second language based on the translation of the user provided phrase, the comparison of demographic information of the first profile and the demographic information of the second profile, the relationship between the presenter and the recipient, and the commemoration type.

10. The method of claim 1, wherein the processor prioritizing the greeting product options further comprises evaluating images supplied by the presenter or the recipient for inclusion in the greeting product options.

11. The method of claim 10 wherein evaluating the images comprises using an algorithm selected from the group consisting of: face detection, pose recognition, expression recognition, gender recognition, age estimation, and skin detection.

12. The method of claim 1 wherein the greeting product options comprise graphic overlays.

13. A method for providing greeting products sent by a presenter to a recipient, the method comprising:
- a computer processor interactively identifying a first profile, wherein the first profile is stored on a remote storage, corresponds to a profile for the presenter and comprises demographic information about the presenter;
- the computer processor interactively identifying a second profile, wherein the second profile is stored on the remote storage, corresponds to a profile for the recipient and comprises demographic information about the recipient;
- the computer processor receiving from the presenter an indication of a relationship between the presenter and the recipient, a commemoration for a greeting product, and an emotional intent for the greeting product;
- the computer processor classifying available greeting product content components according to categorizations with degrees of rating based on the indications of relationship, commemoration, and emotional intent from the presenter;
- the computer processor prioritizing the greeting product content components in accordance with the categorizations from most prioritized to least prioritized;
- the computer processor assembling renderings of greeting product options containing the highest prioritized greeting product components to create a preliminary set of virtual greeting products;
- using the computer processor to provide an interactive selection process for the preliminary set of virtual greeting products, wherein the interactive selection process provides a warning message if a culturally inappropriate greeting product option is chosen;
- using the computer processor to present instructions to the presenter to guide the presenter in providing a culturally appropriate photograph to be incorporated into the preliminary set of virtual greeting products, and to make real time suggestions on improving the preliminary set of virtual greeting products;
- the computer processor receiving a selection from the presenter of one of the preliminary set of virtual greeting products incorporating the culturally appropriate photograph;
- printing a hardcopy version of a selected virtual greeting product or using a communication network to transmit a softcopy version of the selected virtual greeting product to a selected destination.

14. The method of claim 13 wherein the computer processor provides interactive explanations of positive and negative significance and implications of the greeting product components in the preliminary set of virtual greeting products.

15. The method of claim 13 further comprising the computer processor ordering the preliminary set of virtual greeting products in a prioritized list based on the first profile and the second profile.

16. The method of claim 13 wherein the first profile and the second profile are based off of presenter and recipient responses to a particular sequence of questions based on previously provided profiled information.

17. The method of claim 13 further comprising the computer processor receiving a set of rules regarding social mores for the recipient and generating the greeting product components based on the set of rules regarding social mores for the recipient.

18. A cross culture greeting product system for providing a culturally appropriate greeting product sent by a presenter to a recipient, the system comprising a computer processor and a printing device;
- wherein the processor is configured to:
  - interactively create a first profile for the presenter;
  - interactively create a second profile for the recipient;
  - receive from the presenter an indication of a relationship between the presenter and the recipient, a commemoration for a greeting product, and an emotional intent for the greeting product;
  - classify greeting product content components according to categorizations with degrees of rating based on the indications of relationship, commemoration, and emotional intent from the presenter;
  - prioritizing the greeting product content components in accordance with the categorizations from most prioritized to least prioritized;
  - assemble renderings of greeting product options containing the most prioritized greeting product components to create a preliminary set of virtual greeting products;

provide an interactive selection process for the preliminary set of virtual greeting products, wherein the interactive selection process provides a warning message if a culturally inappropriate greeting product option is chosen;

present instructions to the presenter to guide the presenter in providing a culturally appropriate photograph for the greeting product options, and make real time suggestions on improving the greeting product option;

receive a selection from the presenter of one of the greeting product options; and communicate the selection to the printing device;

wherein the printing device is configured to print a hardcopy of the selected greeting product.

19. The system of claim 18 wherein the processor is further configured to provide interactive explanations of positive and negative significance of the greeting product components in the preliminary set of virtual greeting products.

20. The system of claim 18 wherein the processor is further configured to order the preliminary set of virtual greeting products in a prioritized list based on the first profile and the second profile.

21. The system of claim 18 wherein the first profile and the second profile are based off of presenter and recipient responses to a particular sequence of questions based on previously provided profiled information.

22. The system of claim 18 wherein the processor is further configured to generate the greeting product components based on local laws and social mores.

\* \* \* \* \*